(12) United States Patent
Russell et al.

(10) Patent No.: US 11,983,163 B2
(45) Date of Patent: May 14, 2024

(54) SYSTEM AND METHODS FOR ASYNCHRONOUS LOG PROCESSING AND ENRICHING

(71) Applicant: Oracle International Corporation, Redwood Shores, CA (US)

(72) Inventors: Jerry Paul Russell, Seattle, WA (US); Santhosh Kumar Vuda, Bangalore (IN); Kiran Kumar Palukuri, Bangalore (IN); Naga Raju Barri, Hyderabad (IN)

(73) Assignee: Oracle International Corporation, Redwood Shores (CA)

( * ) Notice: Subject to any disclaimer, the term of this patent is extended or adjusted under 35 U.S.C. 154(b) by 92 days.

(21) Appl. No.: 17/829,269

(22) Filed: May 31, 2022

(65) Prior Publication Data

US 2023/0385253 A1 Nov. 30, 2023

Related U.S. Application Data

(63) Continuation of application No. 17/829,213, filed on May 31, 2022.

(51) Int. Cl.
*G06F 16/20* (2019.01)
*G06F 11/14* (2006.01)
(Continued)

(52) U.S. Cl.
CPC ...... *G06F 16/2365* (2019.01); *G06F 11/1451* (2013.01); *G06F 16/215* (2019.01); *G06F 3/04842* (2013.01); *G06F 2201/84* (2013.01)

(58) Field of Classification Search
None
See application file for complete search history.

(56) References Cited

U.S. PATENT DOCUMENTS 7,343,529 B1 * 3/2008 Klinkner ............ G06F 11/0793
714/38.14
8,478,800 B1 7/2013 Johnson et al.
(Continued)

OTHER PUBLICATIONS

International Search Report and Written Opinion for PCT Patent Application No. PCT/US2023/023887, dated Sep. 1, 2023.
(Continued)

*Primary Examiner* — Jau Shya Meng
(74) *Attorney, Agent, or Firm* — Mughal Gaudry & Franklin PC

(57) ABSTRACT

Log data that includes a plurality of log records is asynchronously processed to validate a configuration of each log record and data included in each log record. It is determined that one or more attributes of a particular subset of log records of the plurality of log records corresponds to one or more errors. Using the particular subset, one or more enriched log records are generated by augmenting each log record of the particular subset of log records with error information that indicates one or more categories corresponding to the one or more errors. A user interface is generated to facilitate correction of the one or more errors, the user interface comprising a plurality of interactive elements corresponding to a plurality of error metrics of different categories of errors, wherein the one or more categories of the one or more errors are included in the different categories of errors.

20 Claims, 11 Drawing Sheets

(51) Int. Cl.
    *G06F 16/215*     (2019.01)
    *G06F 16/23*     (2019.01)
    *G06F 3/04842*     (2022.01)

(56) References Cited

U.S. PATENT DOCUMENTS

| | | |
|---|---|---|
| 9,798,607 B1 | 10/2017 | Kulkarni et al. |
| 10,664,535 B1 | 5/2020 | Hahn |
| 2010/0080305 A1 | 4/2010 | Guo et al. |
| 2018/0102938 A1 | 4/2018 | Yoon et al. |
| 2020/0201744 A1* | 6/2020 | Ho .................. G06F 11/3684 |
| 2020/0379836 A1 | 12/2020 | Vaughn et al. |
| 2021/0064500 A1 | 3/2021 | Przestrzelski |
| 2021/0318923 A1 | 10/2021 | Agarwal et al. |
| 2022/0116291 A1 | 4/2022 | Hines et al. |
| 2022/0122184 A1* | 4/2022 | Jing .................. G06F 40/194 |
| 2023/0065188 A1* | 3/2023 | Piagentini ........... G06F 11/2252 |

OTHER PUBLICATIONS

Office Action for U.S. Appl. No. 17/829,213, dated Oct. 18, 2023.

* cited by examiner

SYSTEM AND METHODS FOR ASYNCHRONOUS LOG PROCESSING AND ENRICHING

CROSS-REFERENCE TO RELATED APPLICATIONS

This application is a continuation of U.S. application Ser. No. 17/829,213, filed on May 31, 2022, which is hereby incorporated by reference in its entirety for all purposes.

TECHNICAL FIELD

The present disclosure relates to systems and methods that enhance log data processing and enriching. More particularly, the present disclosure relates to systems and methods that process (e.g., asynchronously process) log data to determine errors in log records and to enrich the log records with annotations, viewable on a user interface, indicating the errors.

BACKGROUND

Data storing and processing often involves high volumes of log data. Systems are utilized for log data intake, processing, storage, and querying. Computing resources associated with the systems are finite. The computing resources must be utilized efficiently to maintain a high log data processing throughput. However, methods for processing the log data are often inefficient and inflexible. For example, synchronously processing of large amounts of log data, for example exceeding terabytes of data in less than a day, is impractical and inefficient. When a set of log data is sufficiently large, the computing resources are bottlenecked in synchronous processing.

Additionally, processing log data involves processing one or more log records of the log data that include an error. The error can be caused by the system, for example during processing, or by the data tenant or user (e.g., user errors). User errors can involve incorrect configurations, incorrect data in the log record, or other similar errors. The systems may not properly identify the error, and the systems may fail to report the identity or type of error to the user or the data tenant for correcting the error. Additionally, a substantial amount of data can be lost due to errors in log data that are not identified or otherwise addressed.

SUMMARY

In some embodiments, a computer-implemented method is provided where log data that includes a plurality of log records is received by a computing system. The log data is asynchronously processed to validate a configuration of each log record of the plurality of log records and data included in each log record of the plurality of log records. It is determined, by the computing system and during the asynchronous processing, that one or more attributes of a particular subset of log records of the plurality of log records corresponds to one or more errors. Using the particular subset of log records, one or more enriched log records are generated by augmenting each log record of the particular subset of log records with error information that indicates one or more categories corresponding to the one or more errors. A user interface is generated to facilitate correction of the one or more errors, the user interface comprising a plurality of interactive elements corresponding to a plurality of error metrics of different categories of errors, wherein the one or more categories of the one or more errors are included in the different categories of errors.

The method may further include identifying input received via the first interface, the input indicating selection of a particular interactive element of the first plurality of interactive elements corresponding to a particular error metric of the plurality of error metrics; and generating a second user interface comprising a second plurality of interactive elements representing a subset of the one or more enriched log records, wherein the subset of the one or more enriched log records includes the one or more enriched log records that include the one or more errors corresponding to the particular error metric.

The method may also include identifying second input received via the second interface, the second input indicating selection of a different particular interactive element of the second plurality of interactive elements corresponding to a particular enriched log record of the subset of the one or more enriched log records; and generating a third user interface comprising the particular enriched log record, wherein the particular enriched log record comprises at least one annotation identifying an error of the one or more errors that corresponds to the particular error metric.

The method may further yet include: generating, for display on the third user interface, one or more suggestions for correcting the error; identifying third input received via the third interface, the third input indicating that the error of the particular enriched log record is corrected; and causing a log record of the plurality of log records corresponding to the particular enriched log record to be reprocessed.

In some instances, the error is a configuration error that prevents the particular enriched log record from being processed, and wherein the at least one annotation comprises a selectable element that links the third user interface to a log data repository that includes a backed-up version of a log record of the plurality of log records corresponding to the particular enriched log record.

In some instances, the method includes: identifying third input received via the third interface, the third input indicating a selection of the selectable element; and providing access to the backed-up version of the log record corresponding to the particular enriched log record to facilitate correction of the log record corresponding to the particular enriched log record.

The different categories of errors may comprise at least one of an invalid configuration, an invalid payload, a structure mismatch, not authorized, not found, or a failure-to-parse.

In some embodiments, a computer-implemented is provided where log data that includes a plurality of log records is received by a computing system. The log data is asynchronously processed to validate a configuration of each log record of the plurality of log records and data included in each log record of the plurality of log records. It is determined, during the asynchronous processing, that an attribute of a particular log record of the plurality of log records corresponds to an error. In response to determining that the particular log record of the plurality of log records corresponds to the error: the computing device determines a category of the error and generates an enriched log record by augmenting the particular log record with error information that indicates the category of the error. The enriched log record is transmitted via a user interface to facilitate correction of the error included in the particular log record.

Receiving the log data may comprise receiving, by the computing device and via real-time input from a data tenant, a first subset of log data; and receiving, by the computing device and via input from a second log data repository, a second subset of log data, wherein the second subset of log data is asynchronously received from the second log data repository, and wherein the received log data is a union of the first subset of log data and the second subset of log data.

The category of the error may comprise at least one of an invalid configuration, an invalid payload, a structure mismatch, not authorized, not found, or a failure-to-parse, and wherein providing the enriched log record comprises generating, by the computing device, the user interface that displays the category of the error.

The method may further include, in response to determining that the particular log record includes the error: generating, by the computing device, an error metric for transmitting to a monitoring service of the computing device, the error metric used to monitor a set of errors associated with the log data; and generating, by the computing device, a backup of data included in the particular log record of the plurality of log records, the backup of the data stored in a third log data repository for allowing the computing device to access the backup of the data to further process the particular log record.

The method may also include determining that the category of the error is payload, wherein generating the enriched log record comprises transmitting, by the computing device, the enriched log record to the log data repository for displaying the enriched log record via the user interface.

In some instances, the method may include in response to determining that the category of the error is configuration: determining, by the computing device, that the error included in the particular log record prevents the particular log record from being processed; generating, by the computing device, a placeholder log record for storage in the log data repository; generating, by the computing device, an interactive element that is configured to retrieve and provide for display the particular log record of the plurality of log records; augmenting, by the computing device, the placeholder log record with the interactive element; and transmitting, by the computing device, the placeholder log record to the log data repository for providing access to the placeholder log record via the user interface.

The plurality of log records may comprise a subset of log records that comprises log records with errors, wherein the user interface comprises a list of selectable elements that corresponds to the subset of log records, and wherein the computer-implemented method further comprises: receiving, by the computing device and via the user interface, input indicating selection of a first selectable element of the list of selectable elements, wherein the first selectable element corresponds to the enriched log record; and generating, by the computing device and for display, a second user interface for displaying details about the enriched log record, wherein the details comprise the error information.

In some embodiments, a system is provided that includes one or more data processors and a non-transitory computer readable storage medium containing instructions which, when executed on the one or more data processors, cause the one or more data processors to perform part or all of one or more methods disclosed herein.

In some embodiments, a computer-program product is provided that is tangibly embodied in a non-transitory machine-readable storage medium and that includes instructions configured to cause one or more data processors to perform part or all of one or more methods disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

BRIEF DESCRIPTION OF THE DRAWINGS

The specification makes reference to the following appended figures, in which use of like reference numerals in different figures is intended to illustrate like or analogous components.

DETAILED DESCRIPTION

Figure 1:
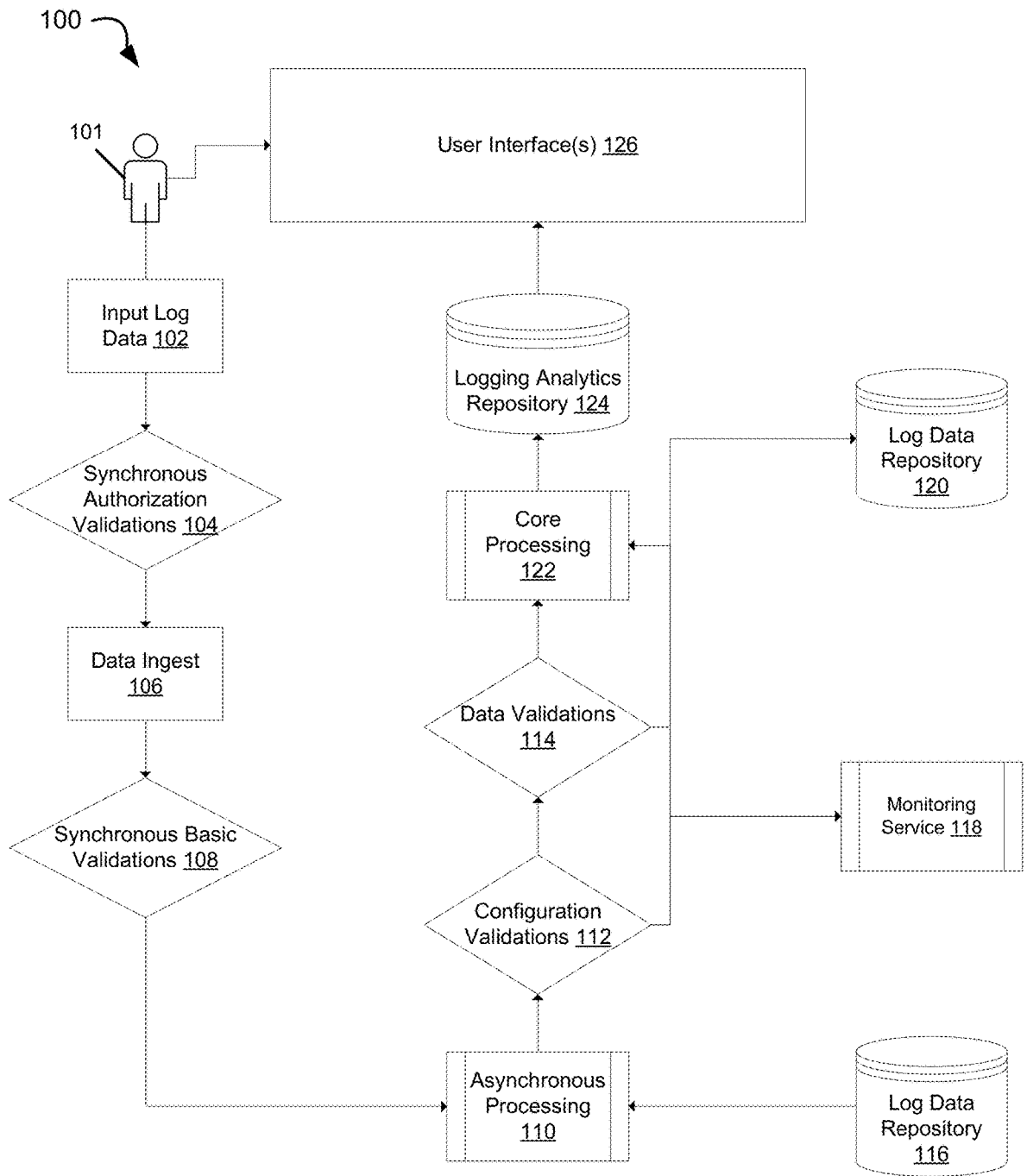
FIG. 1 is a block diagram illustrating an example of a data processing environment according to an embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Overview

Certain aspects and features of the present disclosure relate to enhancing log data processing, storage, query, and the like by processing (e.g., asynchronously processing) the log data to enrich the log data. Processing the log data asynchronously may involve processing received log data upon receipt instead of, for example, synchronously (batch) processing the received log data. Additionally, one or more log records can be detected that include an error. The error may include a configuration error, a data error, or other suitable errors related to log data. The configuration error may indicate that a particular log record is not configured as expected by a processing system. The data error may indicate that data included in the particular log record in incorrect or otherwise cannot be processed. Enriching the log data may involve generating enriched log records by augmenting the particular log record with one or more annotations that indicate the type of error determined with respect to the particular log record. The enriched log records can be stored in a repository accessible by a computing system that can receive queries for the enriched log records and can, in response to receiving one or more of the queries, generate one or more user interfaces for providing the enriched log records for correcting errors in the log data.

As used herein, a "log record" refers to a short segment of data and a corresponding key value pair. A log record may be structured or unstructured data.

As used herein, an "enriched log record" refers to a particular log record that includes at least one annotation that indicates an error of the particular log record.

Data tenants or other suitable users often send their data to data services to store and process the data. The data tenants are sending large and exponentially increasing amounts of log data for processing and storage. Due to the massive volume of log data, synchronously processing the data is impractical and may result in bottlenecks in processing the log data. Additionally, errors may be present in the log data. For example, one or more log records may not be able to be processed or may otherwise encounter errors while processing due to incorrect data included in the one or more log records. Identifying and presenting errors can be difficult when processing large amounts of data. Additionally, failing to identify and/or present the errors may cause data loss among the log records that include an error.

To address at least the above-described problems relating to log data processing, log data can be asynchronously processed and/or enriched. Asynchronous processing of log data, for example processing log data upon receipt instead of (or in addition to) batch processing log data, can increase a maximum amount of log data that can be processed in a time period. For example, synchronously processing the data may introduce increased latency by holding a user processing thread for an excessive amount of time, which would prevent or otherwise hinder generating synchronously processed results with massive amounts of log data. For example, an efficiency of processing the log data is low, and an amount of time required to process the log data is larger, compared to asynchronously processing the log data. Accordingly, asynchronously processing the log data can reduce an amount of time, and increase an efficiency, for processing the log data. Additionally, various computing resources, such as processor usage for processing similar amounts of log data, can be reduced compared to synchronously processing the log data.

Additionally, one or more log records that include errors can be enriched. Enriching the one or more log records can facilitate correction of the one or more log records. For example, enriching the one or more log records can involve annotating the log record with an identification of the error of the log record. The enriched log record, with the error annotation, can be presented to a data tenant or other suitable user for correcting the log record associated with the enriched log record. Additionally or alternatively, a representation of the enriched log message and an error annotation (e.g., that includes the error annotation and that includes a count of or identifiers of log messages associated with the annotated errors) can be presented. Accordingly, the log record can be corrected, and data loss can be avoided.

A user interface can display various error representations and/or metrics. The user interface can be generated using the one or more enriched log records. The one or more enriched records can include one or more different categories of errors, and the error metrics can track data relating to the enriched log records, the different categories of errors, other suitable data relating to the log records, or any suitable combination thereof. For example, one example of an error metric can include an amount of log records having a configuration error. Other examples of error metrics (e.g., data errors in the log records, etc.) can also be used. The user interface can provide the error metrics, the enriched log records, and any suitable data included therein. In some examples, more than one user interface can be used or generated to provide the error metrics, the enriched log records, the data or annotations included therein, or any suitable combination thereof.

Exemplary Environment for Dynamic Lot Indexing and Processing

FIG. 1 is a block diagram illustrating an example of a data processing environment 100 according to some embodiments. The processing environment 100 may be used to process log data (e.g., asynchronously) and enrich log records. In some embodiments, input log data 102 can be input into the processing environment 100 by a user 101, which may be a data tenant or other suitable user of the processing environment 100. The processing environment 100 may perform one or more authorization validations 104 with respect to the input log data 102. For example, the user 101 that input the input log data 102 may be validated such as, for example, by requesting credentials or otherwise authenticating an attempt of the user 101 to transmit the input log data 102 for asynchronous processing and enriching. In some examples, the authorization validations 104 may be synchronously or otherwise batch processed. In response to a failed authorization validation, an error message may be returned to the user 101, and the input log data 102, in this example, may not be processed or enriched. In response to a successful authorization validation, the input log data 102 may be transmitted to a data ingest service 106.

The data ingest service 106 may ingest the input log data 102, may pre-process the input log data 102, otherwise begin processing the input log data 102, or a combination thereof. For example, the input log data 102 can be pre-processed via one or more synchronous basic validations 108. The synchronous basic validations 108 can include basic validations relating to configuration and data. For example, a particular log record of the input log data 102 can fail the synchronous basic validations 108 if the particular log record is empty, includes a configuration not receivable by the processing environment 100, or other suitable validation failures. In some embodiments, the synchronous basic validations 108 may be quick and shallow validations, compared to processing validations (e.g., configuration validations 112 and data validations 114) of the processing environment 100. In response to unsuccessfully validating the log data at the synchronous basic validations 108, the processing environment 100 or other suitable computing device may transmit an error message to the user 101 and may not transmit at least a subset of the input log data 102 further into the processing environment 100.

In response to successfully validating the input log data 102 at the synchronous basic validations 108, the data ingest service 106 or other suitable component of the processing environment 100 transmits the input log data 102 to asynchronous processing 110. The asynchronous processing 110 may initiate asynchronous processing of the input log data 102. For example, the asynchronous processing 110 may perform or otherwise transmit the input log data 102 for performing the configuration validations 112, the data validations 114, other suitable validations, or any suitable combination thereof. The asynchronous processing 110 may asynchronously process or transmit the input log data 102 for processing, and asynchronously processing the input log data 102 involves processing or transmitting the input log data 102 for processing upon receipt of the input log data 102, as compared to batch processing, or synchronously processing, the input log data 102. In some embodiments, asynchronously processing the input log data 102 involves processing the input log data 102 via parallel computing within the input log data 102 or with other suitable input data. In some embodiments, asynchronously processing the input log data 102 increases a computing capacity of the processing environment 100 and may increase a rate at which the input log data 102 is processed and/or enriched.

In some embodiments, the input log data 102 and additional data from a log data repository 116 can be transmitted to the asynchronous processing 110. The additional data can include previous log records. For example, the previous log records may have previously included one or more errors that prevented processing of the previous log record, and the one or more errors may have been corrected prior to transmitting the previous log records to the asynchronous processing 110. The additional data can include other suitable log data that can be stored in the log data repository 116. The asynchronous processing 110 receives and asynchronously processes or transmits the input log data 102 and the additional data for processing. In some embodiments, the asynchronous processing 110 processes, in parallel, the input log data 102 and the additional data.

The configuration validations 112 can include validations or other suitable verifications relating to a configuration of each log record included in the input log data 102 and/or the additional data. For example, a particular log record of the input log data 102 may be expected to be configured as a JSON file but may not be a JSON file or may be a corrupted or incorrectly configured JSON file. Accordingly, the processing environment 100 may not be able to process the particular log record. In response to failing one or more of the configuration validations 112, the particular log record, or any data or metadata thereof, may be transmitted to monitoring service 118 for recording the failed configuration validation of the particular log record. Additionally, data included in the particular log record can be duplicated or otherwise backed-up and saved to a log data repository 120.

The data validations 114 can include validations or other suitable verifications relating to data included in each log record of the input log data 102 and/or the additional data. For example, the particular log record may include incorrect data such as an incorrect pointer, an incorrect data value, an incorrect function, other suitable incorrect data, or any suitable combination thereof. Accordingly, the processing environment 100 may not be able to properly or successfully process the particular log record. In response to failing one or more of the data validations 114, the particular log record, or any data or metadata thereof, may be transmitted to monitoring service 118 for recording the failed configuration validation of the particular log record.

The monitoring service 118 tracks or otherwise monitors errors detected or otherwise determined during the asynchronous processing 110, the configuration validations 112, and the data validations 114, etc. The monitoring service 118 can receive instances of each error detected during processing of the input log data 102 and the additional data, and the monitoring service 118 can generate or otherwise receive error metrics relating to the processing of the input log data 102 and/or the additional data. The error metrics include a category of detected errors, an amount of errors, unidentifiable log records, and unprocessed log records, etc. The monitoring service 118 can provide the error metrics and any other suitable data for use in correcting one or more log records.

Upon performing configuration validations 112, data validations 114, and any other suitable asynchronous validations or processing, the processing environment 100 may transmit the input log data 102 and/or the additional data to core processing 122. The core processing 122 may process the input log data 102 and/or the additional data. Processing the input log data 102 and/or the additional data involves performing tasks requested by the user 101 or other suitable entity to be performed with respect to the input log data 102 and/or the additional data. Additionally, processing the input log data 102 and/or the additional data can involve processing the input log data 102 and/or the additional data for storage and for query. The core processing 122 can involve storing processed log records from the input log data 102 and/or the additional data in a logging analytics repository 124, and the processed log records stored in the logging analytics repository 124 can be accessed, for example by one or more queries, via one or more user interfaces 126.

The core processing 122 involves processing log records that include one or more errors. In some embodiments, the core processing 122 receives enriched log records, and in other embodiments, the core processing 122 generates the enriched log records based on the one or more errors. An enriched log record includes an annotation that identifies an error in a log record corresponding to the enriched log record. For example, the core processing 122 can receive the particular log record and can identify an error associated with the particular log record. In some embodiments, the core processing 122 can receive an indication from the configuration validations 112, from the data validations 114, from other suitable components, or from any suitable combination thereof that indicates the error of the particular log record. The core processing 122 can use the indication of the error to generate an annotation and to augment the particular log record with the annotation to generate the enriched log record. The annotation includes information identifying the error included in the particular log record. For example, the annotation can include the category of the error, a location of the error in the particular log record, one or more suggestions of how to fix the error, whether the error prevents or prevented the particular log record from being processed, other suitable annotation information, or any suitable combination thereof. In some embodiments, one or more other components, such as the asynchronous processing 110 and the like, can generate the enriched log record and transmit the enriched log record to the core processing 122 for processing, storing, and providing (e.g., via query and the user interface(s) 126) the enriched log records.

In some embodiments, a particular enriched log record corresponds to a log record that includes a configuration error or other similar error that prevents the log record from being processed. The log record can be duplicated or otherwise backed-up to the log data repository 120 for preventing data loss during processing of the log record. Additionally, the core processing 122 or any other suitable component of the processing environment 100 can generate a placeholder log record as the particular enriched log record. For example, the placeholder log record includes a link or other suitable interactive element for accessing the backed-up log record stored in the log data repository.

The processing environment 100 can generate the one or more user interfaces 126 for accessing the logging analytics repository 124. In some embodiments, the logging analytics repository 124 is or otherwise includes a database that stores processed log records and enriched log records. The logging analytics repository 124 is configured to provide access, via the one or more user interfaces 126, to the processed log records, which may not include detected errors, and the enriched log records.

The one or more user interfaces 126 can include one user interface, two user interfaces, three user interfaces, or more user interfaces for providing access to the enriched log records, for correcting or facilitating correction of the enriched log records, and for other suitable purposes. For example, the processing environment 100 can generate a first user interface of the one or more user interfaces 126 that includes a set of interactive elements corresponding to error metrics. The error metrics may be tracked or otherwise accumulated via the monitoring service 118 or other suitable components of the processing environment 100. The set of interactive elements can display, via the first user interface, the error metrics, and the set of interactive elements may correspond to the error metrics. For example, a first interactive element may correspond to a first error metric, such as unprocessed log records, and a second interactive element may correspond to a second error metric, such as log records with errors, etc.

In response to receiving input, for example from the user 101, indicating selection of at least one interactive element included in the first user interface, the processing environment 100, or other suitable component thereof, generates a second user interface of the one or more user interfaces 126. The second user interface includes a set of enriched log records corresponding to an error metric that corresponds to the selected interactive element of the first user interface. For example, the selected interactive element can include an interactive element corresponding to unprocessed log records. Accordingly, the second user interface can include a second set of interactive elements that correspond to a list or other suitable set of enriched log records corresponding to the unprocessed log record error metric.

In response to receiving input, for example from the user 101, indicating selection of at least one interactive element included in the second user interface, the processing environment 100, or other suitable component thereof, generates a third user interface of the one or more user interfaces 126. The third user interface includes details of a particular enriched log record corresponding to the selected interactive element of the second user interface. For example, the third user interface may display details about the particular enriched log record. The details can include metadata of the particular enriched log record, values or other data included in the particular enriched log record, an annotation of an error associated with the particular enriched log record, other suitable details, or any suitable combination thereof. The processing environment 100, or any suitable component thereof, can generate other suitable user interfaces 126 for facilitating correction of the log records corresponding to the enriched log records.

Exemplary Process for Asynchronous Lot Data Processing and Enriching

Figure 2:
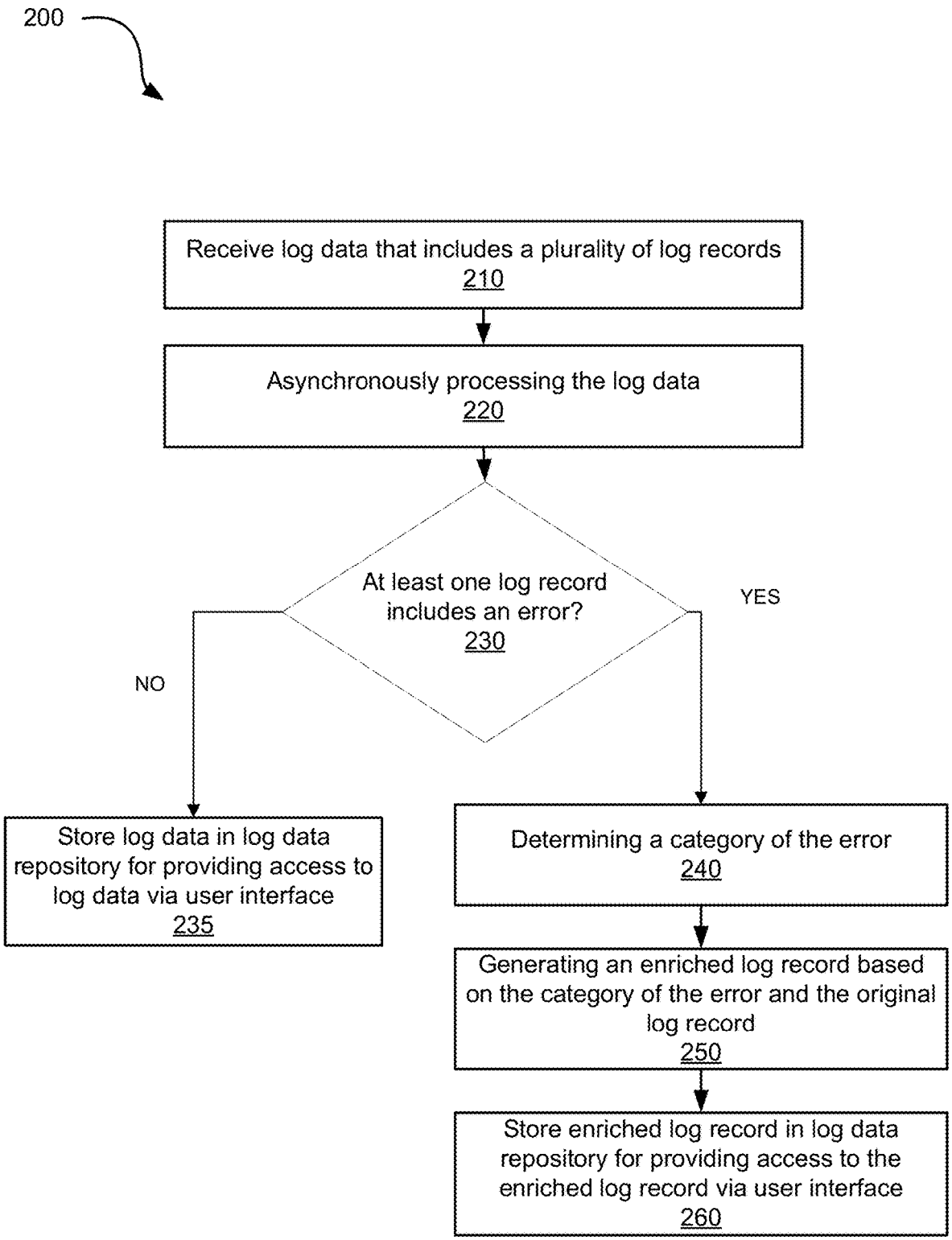
FIG. 2 is a flow chart of a process for asynchronously processing and enriching log data according to an embodiment.

FIG. 2 is a flowchart illustrating an example of a process 200 for asynchronously processing and enriching log data. Process 200 may be performed at least in part by any of the components described in the figures herein, for example, by any component of the processing environment 100 or by the processing environment 100, itself. Process 200 can begin at block 210, when log data that includes a set of log records is received. The log data may be received by a user, such as a data tenant, or from a first log data repository that includes previous log records that may have previously been prevented from being processed, for example due to a configuration or other suitable error. The received log data can undergo synchronous pre-processing that may prevent some faulty or unauthorized log records from being processed. In some embodiments, the received log data includes one or more errors such as configuration errors and payload errors.

At block 220, the received log data is asynchronously processed. Asynchronously processing the received log data involves processing the received log data upon receiving the log data and optionally in parallel with additional data. Asynchronously processing the log data may prevent bottlenecks or other processing difficulties associated with synchronous or batch processing of the log data. In some embodiments, asynchronously processing the received log data involves performing one or more validations of log records included in the received log data. For example, the one or more validations include configuration validations, data or payload validations, other suitable asynchronous validation operations, or any suitable combination thereof.

A configuration validation involves validating a configuration of a particular log record or otherwise determining whether the configuration of the particular log record includes an error. For example, a log record may be configured as an XML file, but the processing environment 100 or other computing entity performing the asynchronous processing of the received log data may expect the log record to be configured as a JSON file. Accordingly, the processing environment 100 or other computing entity performing the asynchronous processing of the received log data may not be able to process the log record. Other suitable configuration validations can be performed via the asynchronous processing.

A data or payload validation involves validating the payload or other suitable data included in a log record. For example, the log record can include various types of payload or other suitable data. The processing environment 100 may expect the log record to include a first type of payload that is different than a second type of payload included in the log record. Additionally, the payload may include typographical errors or other errors such as incorrect pointers, function calls, etc. Accordingly, while the processing environment 100 or other computing entity performing the asynchronous processing of the received log data may be able to process the log record, the payload or data error may prevent accurate or complete processing of the log record. Other suitable data or payload validations can be performed via the asynchronous processing.

At block 230, the processing environment 100 or other computing entity performing the asynchronous processing of the received log data determines whether one or more log records of the received log data includes an error. The error may be identified during the asynchronous processing of the received log data, for example during or subsequent to a configuration validation, a data or payload validation, or a combination thereof. At block 235, and in response to determining that no log records in the received log data include an error, the asynchronously processed log data is stored in a log data repository. The log data repository may be a second log data repository that is the same as or different than the first log data repository. Additionally, the log data repository may store the processed log data and provide the processed log data for display, for example via one or more user interfaces, for query, or for other suitable tasks.

At block 240, and in response to determining that at least one log record of the received log data includes an error, a category of the error is determined. The category of the error can include configuration, data or payload, other suitable error categories, or any suitable combination thereof. In some embodiments, the category of the error can be any one of: (i) an invalid configuration, (ii) an invalid payload or data, (iii) a structure mismatch, (iv) a not authorized or not found, and (v) a parser failure. Other suitable categories of errors can be determined for the one or more log records.

The invalid configuration error category involves an invalid or incorrect configuration or file type of a particular log record. The invalid payload or data error category involves an invalid format of the particular log record, a size of the particular log record exceeding a maximum size limit, an invalid archive format of the particular log record, and the like. The structure mismatch error category involves a mismatch between data included in the particular log record and an entry start expression of a parsing entity that parses the particular log record. Accordingly for the structure mismatch error category, at least a subset of the log records having a structure mismatch may not yield a processed log entry since parsing cannot start due to the structure mismatch. The not authorized or not found error category involves authorization errors or missing log records from the first log data repository. For example, a log record having a not authorized or not found error may include an object call that may not be accurate or may otherwise prevent the log record from being retrieved from an object storage. The parser failure error category involves a mismatch in applying a base parser on the log record to extract fields of the log record.

At block 250, an enriched log record is generated. The enriched log record is generated based on the determined category of the identified error and based on the log record that includes the identified error. In some embodiments, the processing environment 100, or any suitable component thereof, generates an annotation that includes at least the category of the error. For example, the annotation can include the category of the error, an identification of the error, a processing failure experienced due to the error, a location of the error, one or more suggestions for correcting the error, other suitable information relating to the error, or any suitable combination thereof. The annotation is augmented to the particular log record that includes the error to generate the enriched log record. For example, the annotation can be augmented to any suitable portion, such as an introductory or top portion, of the particular log record to generate the enriched log record. Accordingly, upon viewing the enriched log record, the user may be able to quickly determine the category of the error, determine an identity of the error, determine how to correct the error, and the like.

In embodiments in which the error, such as a configuration error, of the particular log record prevents the particular log record from being processed, the annotation may additionally or alternatively include a link or other suitable interactive element. And, the annotation may be augmented to a placeholder log record that represents the particular log record for generating the enriched log record. The link or other suitable interactive element may connect the enriched log record with a backed-up or duplicated version of the particular log record for preventing data loss during asynchronous processing of the log data.

At block 260, the enriched log record is stored in the log data repository. The log data repository may provide access, for example via one or more user interfaces and in response to one or more queries, to the enriched log record. In some embodiments, the log data repository can receive one or more queries for accessing the enriched log record. For example, a user can submit, via one or more user interfaces or other suitable mediums, a query to the log data repository, and the log data repository provides the enriched log record. The enriched log record is provided for display, analysis, correction of one or more errors of the associated log record, and for any other suitable purposes.

Exemplary Process for Providing Enriched Lot Data via a User Interface

Figure 3:
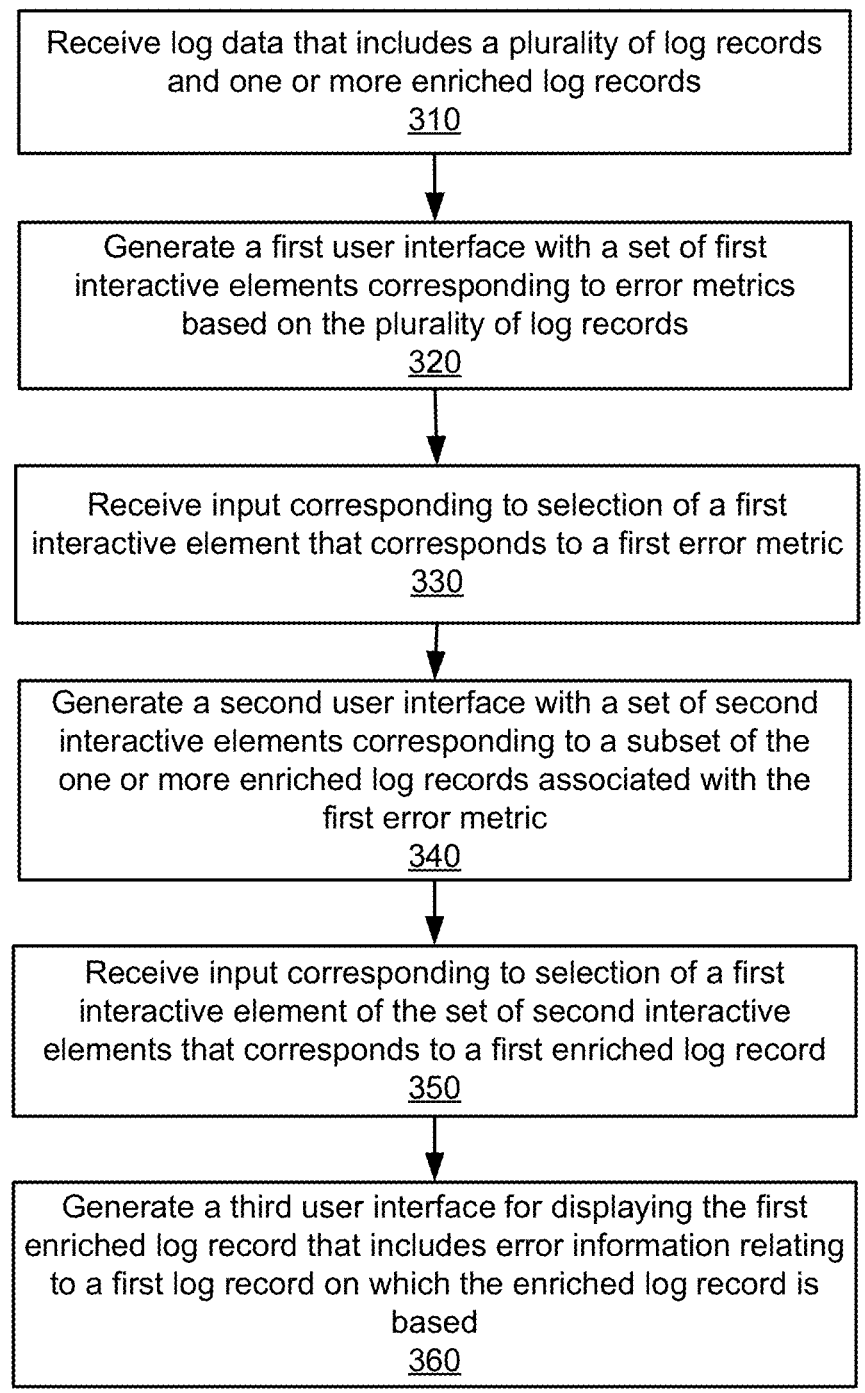
FIG. 3 is a flow chart of a process for generating a set of user interfaces for enhancing log data according to an embodiment.

FIG. 3 is a flowchart illustrating an example of a process 300 for providing enriched log data via a user interface. Process 300 may be performed at least in part by any of the components described in the figures herein, for example, by any component of the processing environment 100 or by the processing environment 100, itself. Process 300 can begin at block 310, when log data is received. The received log data includes a set of log records, and, in some embodiments, the processing environment 100 or any other suitable computing entity asynchronously processes the log records. For example, the processing environment 100 or any suitable component thereof performs configuration validations, payload or data validations, or other suitable validations with respect to the log records of the received log data. One or more errors can be detected or otherwise determined with respect to the log records, and enriched log records can be generated based on the log records and the one or more detected errors. For example, an annotation, which includes error information such as a category of the error, can be augmented to one or more log records with errors to generate the enriched log records. The enriched log records can be stored in a data repository for providing the enriched log records via one or more user interfaces for correcting the associated log records.

At block 320, a first user interface having a first set of interactive elements is generated. The first set of interactive elements corresponds to one or more error metrics. The error metrics can include one error metric, two error metrics, three error metrics, statistics corresponding to the one or more error metrics, other suitable information, or any suitable combination thereof. In some embodiments, the error metrics are tracked and accumulated by the monitoring service 118 of the processing environment 100. Examples of the error metrics can include unprocessed log records, unidentified log records, log records processed with errors, and any other suitable types of error metrics. Accordingly, the first set of interactive elements can include a number of interactive elements that corresponds to a number of error metrics. For example, if there are three error metrics, the first set of interactive elements can include at least three interactive elements such that each interactive element of the at least three interactive elements represents a different error metric of the three error metrics. In some embodiments, more than three interactive elements may be included in the first set of interactive elements. For example, three interactive elements corresponding to the three error metrics may be generated and included in the first user interface, and one or more additional interactive elements corresponding to statistics of the error metrics may be generated and included in the first user interface. The statistics may include timestamps of the errors included in the error metrics or any other suitable comparison or statistic relating to the errors included in the error metrics.

In some embodiments, the first set of interactive elements may be arranged in an array on the first user interface. For example, the first set of interactive elements may be arranged in a rectangular shape or any other suitable arrangement for displaying the error metrics on the first user interface. In some embodiments, each interactive element displays the corresponding error metric or the statistic. In one such example, a particular interactive element that corresponds to unprocessed log records may display a number of log records that are unprocessed for a given amount of time.

At block 330, input is received, via the first user interface, indicating selection of a first particular interactive element of the first set of interactive elements. For example, a user, such as the data tenant or other suitable user of the processing environment 100, can input a selection of the first particular interactive element. The input is received via the first user interface and can be input using a computer mouse, a computer keyboard or any other suitable input device. The first user interface can receive any other suitable input relating to the error metrics and the first set of interactive elements.

At block 340, a second user interface having a second set of interactive elements is generated. In response to receiving input indicating selection of the first particular interactive element, the processing environment 100 or other suitable computing entity generates the second user interface. The second user interface includes or otherwise displays the second set of interactive elements, which corresponds to the error metric represented by the first particular interactive element. For example, if the first particular interactive element represents processed log records with errors, then the set of second interactive elements may include interactive elements corresponding to enriched log records having data or payload errors that yields processed log records with errors. In other examples, if the first particular interactive element represents unprocessed log records, then the second set of interactive elements may include interactive elements corresponding to enriched log records representing log records having a configuration error that prevented the log records from being processed. The second set of interactive elements can include any other suitable interactive elements corresponding to different types of enriched log records.

In some embodiments, the second set of interactive elements is arranged as a list on the second user interface. For example, the second set of interactive elements can include a list of enriched log records, and the list of enriched log records can be displayed on the second user interface. Each enriched log record of the list of enriched log records can be interactive such that selecting a particular enriched log record of the list of enriched log records causes the particular enriched log record, and any data or metadata thereof, to be displayed on the second user interface. The second set of interactive elements can be otherwise suitably arranged on the second user interface for providing the user or other suitable entity with a list of enriched log records from which to select the particular enriched log record.

At block 350, input is received, via the second user interface, indicating selection of a second particular interactive element of the second set of interactive elements. For example, a user, such as the data tenant or other suitable user of the processing environment 100, can input a selection of the second particular interactive element. The input is received via the second user interface and can be input using a computer mouse, a computer keyboard or any other suitable input device. The second user interface can receive any other suitable input relating to the enriched log records represented by the second set of interactive elements.

At block 360, a third user interface having an enriched log record corresponding to the second particular interactive element is generated. In response to receiving input indicating selection of the second particular interactive element, the processing environment 100 or other suitable computing entity generates the third user interface. The third user interface includes or otherwise displays a particular enriched log record corresponding to or otherwise represented by the second particular interactive element. In some embodiments, the third user interface includes or otherwise displays data or metadata about the particular enriched log record, which corresponds to a log record with an error. For example, the third user interface displays data or payload included in the log record, suitable metadata about the log record, an annotation augmented into the log record, other suitable information relating to the log record or the particular enriched log record, or any suitable combination thereof.

The annotation may be generated by the processing environment 100, any suitable component thereof, or any other suitable computing entity. The annotation includes information about an error associated with the log record. For example, the annotation can include a category of the error, an identification of the error, a string of characters or other payload that may have caused the error, a location of the error in the log record, one or more suggestions of how to correct the error, other suitable information, or any suitable combination thereof. The annotation is augmented into the log record to generate the particular enriched log record, and the annotation may be displayed at a top or introductory portion of the displayed, particular enriched log record or in other suitable locations with respect to the particular enriched log record. In some embodiments, the annotation is augmented into the log record and displayed on the third user interface such that the annotation is prominently displayed on the third user interface or otherwise easy for the user to view on the third user interface.

Exemplary User Interfaces

Figure 4:
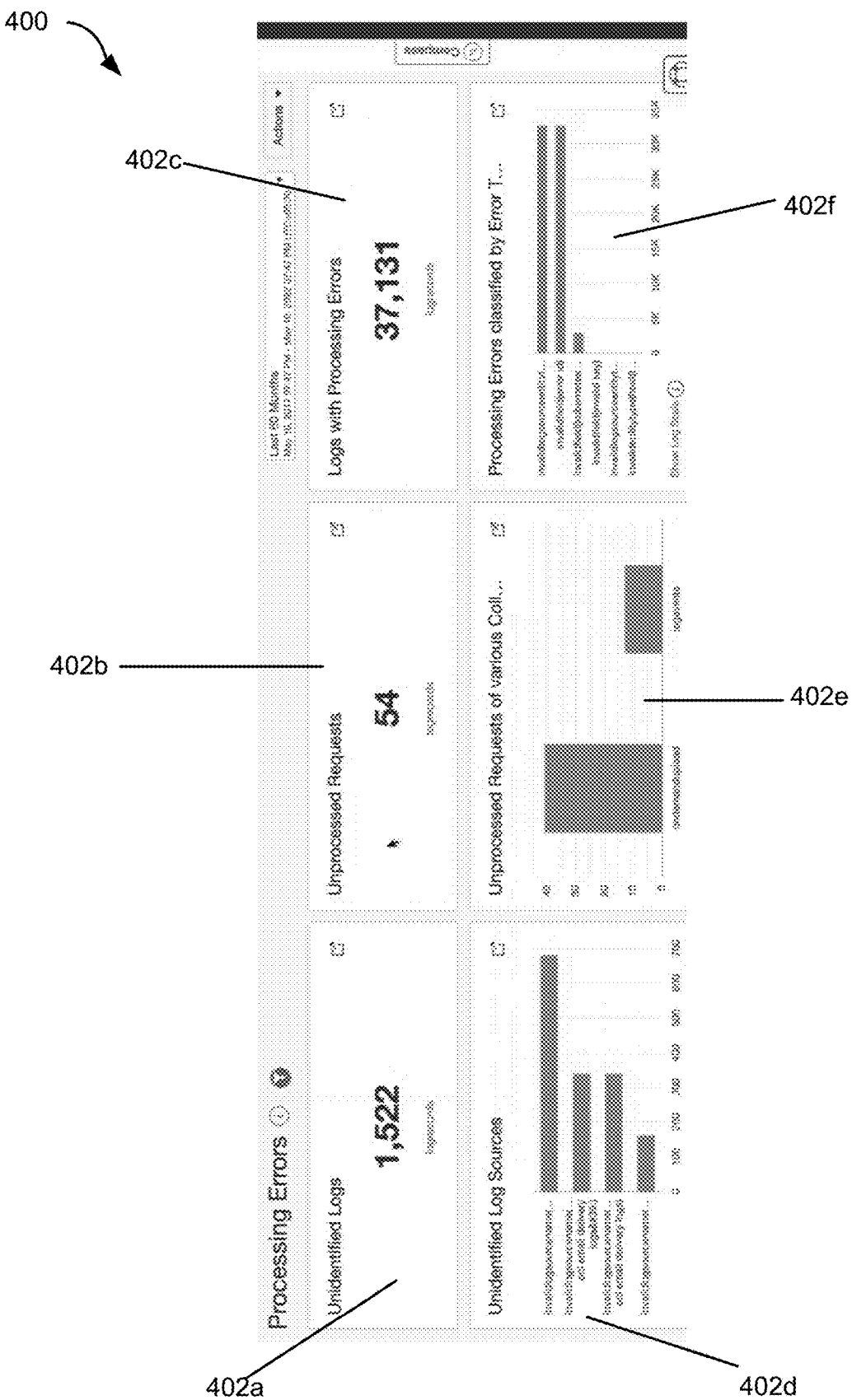
FIG. 4 is an example of a user interface for displaying error metrics according to an embodiment.

FIG. 4 is an example of a user interface 400 for displaying error metrics according to an embodiment. The user interface 400 may be or otherwise include the first user interface described, for example, with respect to the block 320 of the process 300. The user interface 400 includes a first set of interactive elements 402. As illustrated, the first set of interactive elements 402 includes six interactive elements 402a-f, though any other suitable numbers, such as less than six or more than six, of interactive elements can be included in or otherwise displayed on the user interface 400. The first set of interactive elements 402 is illustrated as being arranged in an array on the user interface 400, but other suitable arrangements of the first set of interactive elements 402 are possible. In some embodiments, the first set of interactive elements 402 corresponds to error metrics, which may be tracked or otherwise accumulated by the processing environment 100 or any suitable component thereof such as the monitoring service 118. The error metrics include unprocessed log records, unidentified log records, log records processed with errors, and any other suitable error metric.

Each interactive element 402 of the first set of interactive elements 402 corresponds to a different error metric or statistic based on an error metric. The interactive element 402a corresponds to the unidentified log record error metric, the interactive element 402b corresponds to the unprocessed log record error metric, and the interactive element 402c corresponds to the log records processed with errors error metric. The unidentified log record error metric may correspond to log records that are not identified such as log records with invalid sources or authorizations. The unprocessed log record error metric may correspond to log records that are not processed due to a configuration error or other similar error. The log records processed with errors error metric may correspond to processed log records that include one or more data or payload errors.

The interactive elements 402d-f correspond to statistics about the error metrics. For example, the interactive element 402d corresponds to sources of log records corresponding to the unidentified log record error metric, the interactive element 402e corresponds to an origination of log records corresponding to the unprocessed log record error metric, and the interactive element 402f corresponds to a distribution of identifications of errors that cause log records to be processed with errors as indicated by the log records processed with errors error metric. Any other suitable number or type of interactive elements 402 can be generated and displayed on the user interface 400 for providing the error metrics to the user or other suitable entity.

In some embodiments, a user or other suitable entity provides input, for example using a computer mouse or other suitable computer input device, via the user interface 400. The input can include a selection of at least one interactive element 402a-f of the first set of interactive elements 402. The processing environment 100, any suitable component thereof, or any other suitable computing entity can, in response to receiving the input indicating selection of the at least one interactive element 402, generate a subsequent user interface. The subsequent user interface is generated based on the selection of the at least one interactive element 402. For example, if the interactive element 402a is selected, then the subsequent user interface may be generated to include a list of one or more enriched log records corresponding to the unidentified log record error metric. In another example, if the interactive element 402b is selected, then the subsequent user interface may be generated to include a list of one or more enriched log records corresponding to the unprocessed log record error metric, etc.

Figure 5:
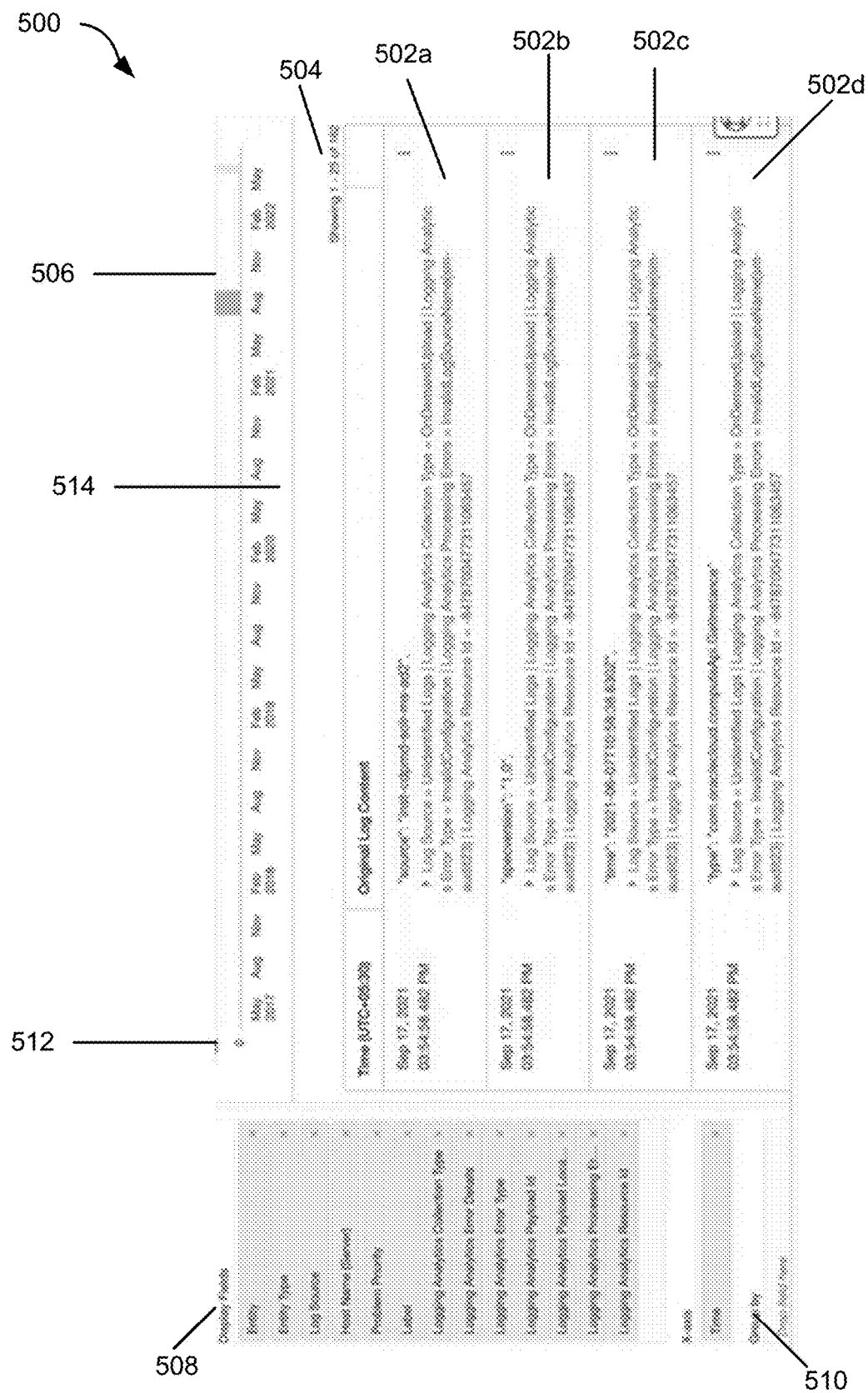
FIG. 5 is an example of a user interface for displaying enriched log records according to an embodiment.

FIG. 5 is an example of a user interface 500 for displaying enriched log records according to an embodiment. The user interface 500 may be or otherwise include the second user interface described, for example, with respect to the block 340 of the process 300. The user interface 500 includes a second set of interactive elements 502, an element tracker 504, a plot 506, display options 508, and a plot controller 510. As illustrated, the second set of interactive elements 502 includes four interactive elements 502a-d, though any other suitable numbers, such as less than four or more than four, of interactive elements 502 can be included in or otherwise displayed on the user interface 500. The second set of interactive elements 502 is illustrated as being arranged as a list on the user interface 500, but other suitable arrangements of the second set of interactive elements 502 are possible. In some embodiments, the second set of interactive elements 502 corresponds to enriched log records that include an error corresponding to the selected error metric.

Each interactive element 502 of the second set of interactive elements 502 corresponds to a different enriched log record having an error associated with the error metric. The interactive element 502a corresponds to a first enriched log record, the interactive element 502b corresponds to a second enriched log record, the interactive element 502c corresponds to a third enriched log record, and the interactive element 502d corresponds to a fourth enriched log record. Each of the first, second, third, and fourth enriched log records may represent a different log record having a similar error associated with the selected error metric. For example, the enriched log records displayed on the user interface 500 represent log records that include a configuration or identification error, which caused each of the displayed log records to be unidentified.

Each interactive element 502 of the second set of interactive elements 502 are selectable. For example, a user can provide input, for example using a computer mouse, to the user interface 500 for selecting a particular interactive element 502. Additionally, the user can use a computer input device to scroll to find a desired interactive element 502 to select. Selecting the particular interactive element 502 may cause data about a corresponding enriched log record to be displayed, for example via a subsequent user interface.

The user interface 500 can include the element tracker 504, which can track the number of enriched log records generated for display on the user interface 500. For example, and as illustrated, the element tracker 504 indicates that 25 enriched log records are generated on the user interface 500 and that a total of 162 enriched log records are available for selection based on selection of a particular interactive element of the first set of interactive elements 402. Additionally, the user interface 500 can include the plot 506, which can illustrate an amount of log records, over a selected period of time, having the error corresponding to the selected error metric. The plot 506 includes a horizontal axis 512, which represents time, and a vertical axis 514 representing an amount of the log records having the error corresponding to the selected error metric. The plot 506 can be controlled by the plot controller 510, which can allow adjustment of the horizontal axis 512 of the plot 506 and other suitable adjustments to the plot 506.

In some embodiments, the second set of interactive elements 502 can display a subset of information about corresponding enriched log records. For example, the interactive element 502b displays, on the user interface 500, a time of processing or storage of the enriched log record, a source of the log record, and other suitable information such as an annotation included in the enriched log record. As illustrated, the interactive element 502b displays the annotation, which includes at least a subset of the error information relating to the error included in the log record. For example, the log record include a configuration error and a logging analytics processing or payload error, and the interactive element 502b displays the category or type of the errors. Each interactive element of the second set of interactive elements 502 can display or otherwise include any other suitable information relating to the enriched log record.

Figure 6:
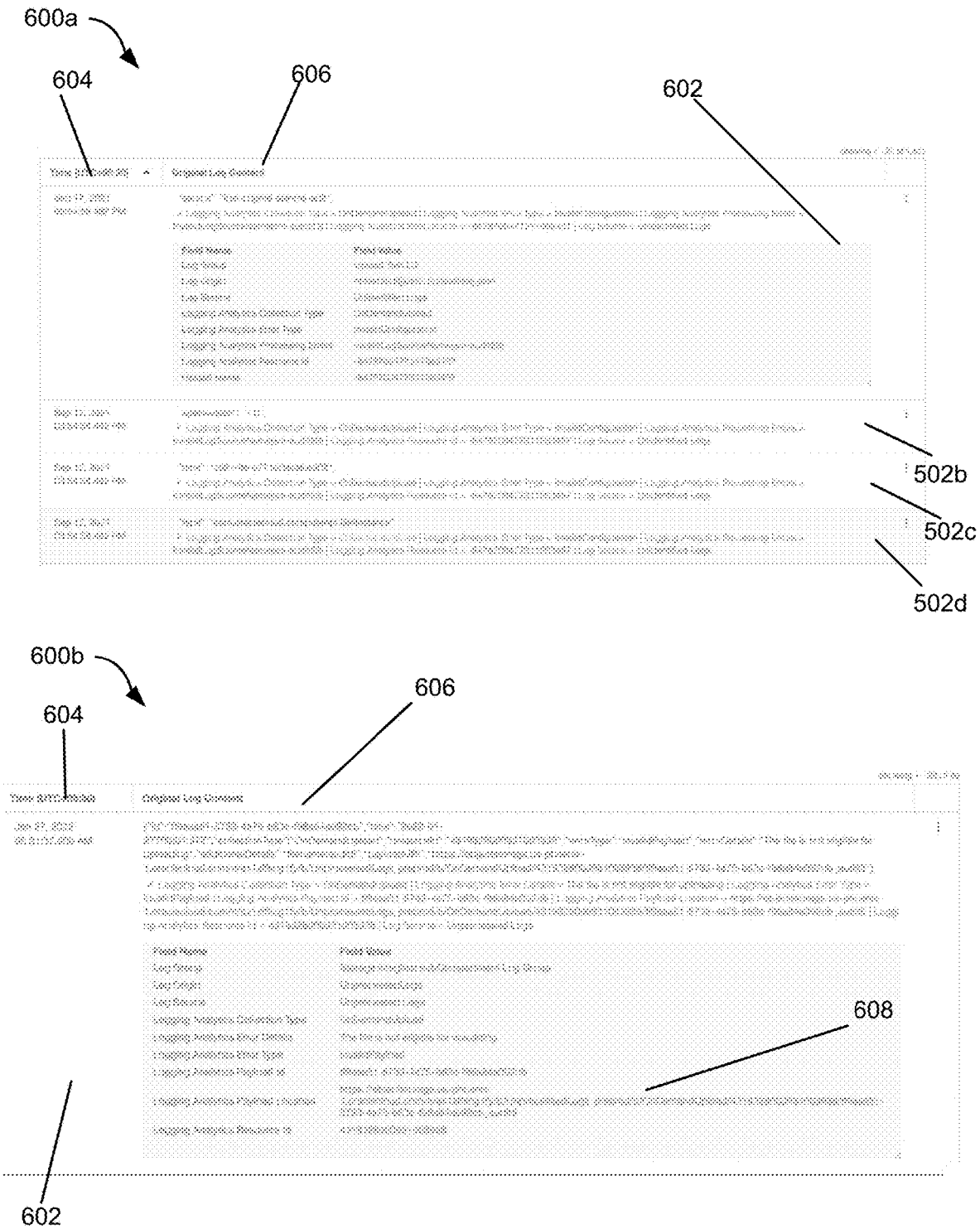
FIG. 6 is an example of two user interfaces for displaying an annotation of a selected enriched log record according to an embodiment.

FIG. 6 is an example of two user interfaces 600a-b for displaying an annotation of a selected enriched log record according to an embodiment. The user interface 600a and the user interface 600b may each be examples of or otherwise include the third user interface described, for example, with respect to the block 360 of the process 300. The user interface 600a includes a selected interactive element 602. In some embodiments, the selected interactive element 602 corresponds to the interactive element 502a displayed on the user interface 500, and selecting, via input into the user interface 500, the interactive element 502a causes the user interface 600a to be generated for displaying the selected interactive element 602. Additionally, the user interface 600 includes interactive elements 502b-d, an organization column 604, and an information column 606. The interactive elements 502b-d may be displayed on both the user interface 500 and the user interface 600a. The user can select, for example after viewing information about the selected interactive element 602, one or more of the interactive elements 502b-d via input into the user interface 600a for viewing information about one or more of the interactive elements 502b-d.

The organization column 604 displays one or more pieces of metadata about the enriched log record corresponding to the selected interactive element 602. For example, and as illustrated, the user interface 600a displays timestamps in the organization column 604 for respective interactive elements corresponding to enriched log records. Accordingly, the interactive elements displayed on the user interface 600a (and the user interface 500) can be organized by time or by any other suitable organizational data such as a resource ID, an error type, and the like.

The information column 606 displays one or more pieces of information about or included in the enriched log record corresponding to the selected interactive element 602. For example, and as illustrated, the user interface 600a displays, via the information column 606, an error type, processing error fields, such as a source, an annotation, a log group, a log origin, and other suitable information about the enriched log record corresponding to the selected interactive element. Additionally, as illustrated, the annotation of the enriched log record is displayed at a top portion or otherwise easily identifiable portion of the enriched log record for providing the annotation to the user. The annotation includes error information relating to an error included in the log record corresponding to the selected interactive element 602.

In some embodiments, the error information includes a category of the error, an identification of the error, a location of the error in the log record, a source of the error, other suitable error information, or any suitable combination thereof. Additionally or alternatively, and in examples in which the log record includes an error that prevented processing of the log record, the user interface 600b can be generated. The user interface 600b includes the selected interactive element 602, the organization column 604, the information column 606, and any other suitable components. The user interface 600b include an annotation that is augmented into the enriched log record represented by the selected interactive element 602 displayed via the user interface 600b. The annotation includes a pointer 608 or other suitable interactive element that links the enriched log record to a backed-up version of the log record. The backed-up version of the log record may be stored or otherwise provided from a separate log data repository for preventing data loss during asynchronous processing of the log data. The pointer 608 in the annotation may provide access to the backed-up version of the log record for facilitating correction of the log record. In some embodiments, selecting the pointer 608 in the annotation may cause a subsequent user interface to be generated for displaying or otherwise providing the backed-up version of the log record to the user for correcting the log record.

Figure 7:
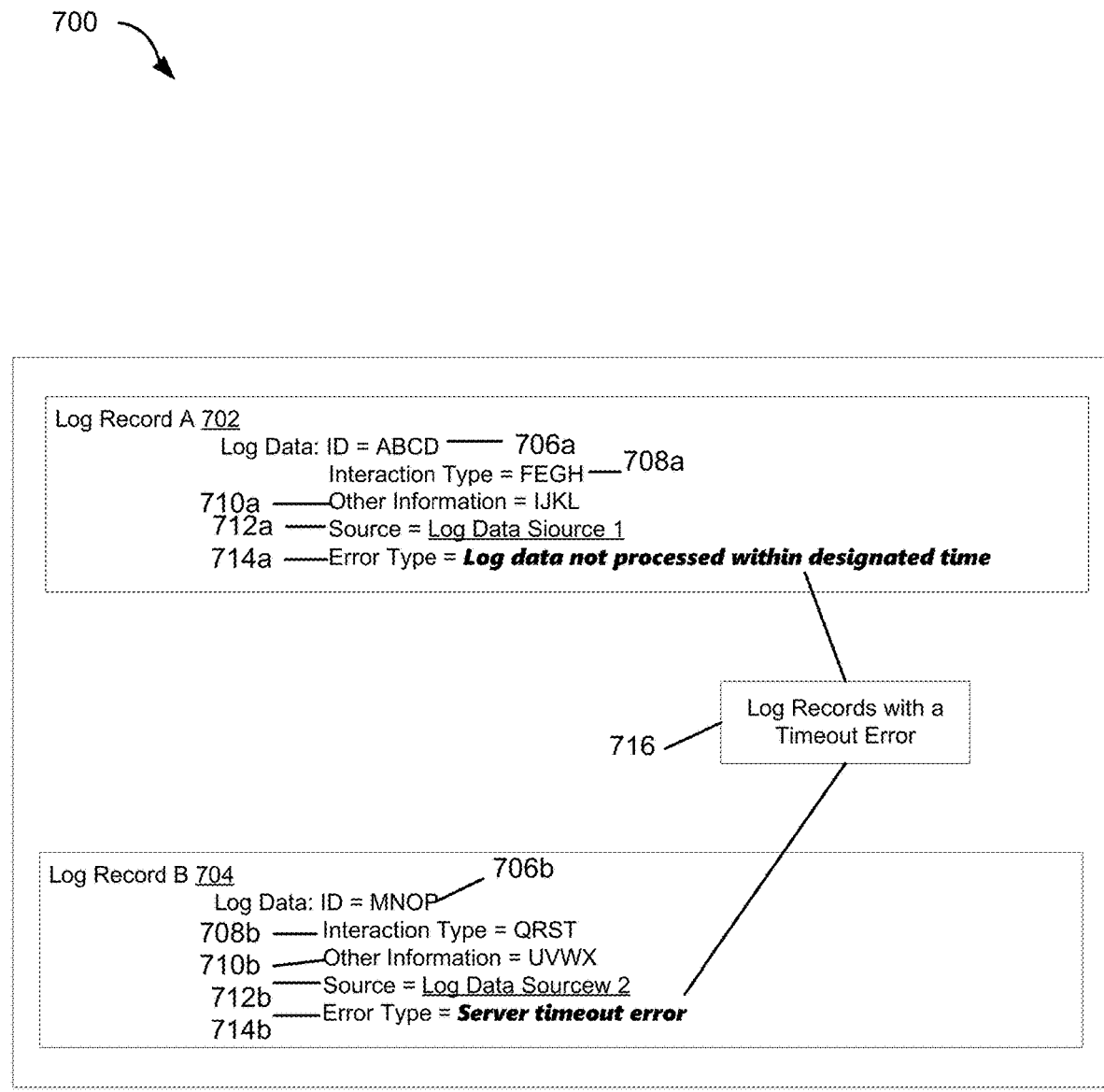
FIG. 7 is an example of a user interface for displaying different log records with a similar error highlighted in the respective log record according to an embodiment.

FIG. 7 is an example of a user interface 700 that displays different log records that were detected as including a similar error according to an embodiment. As illustrated, the user interface 700 includes log record A 702 and log record B 704. Each of the log record A 702 and the log record B 704 includes respective log data. For example, the log data of the log record A 702 includes an identification 706a, an interaction type 708a, other information 710a, a source 712a, and an error type 714a. Additionally, the log data of the log record B 704 includes an identification 706b, an interaction type 708b, other information 710b, a source 712b, and an error type 714b. In the illustrated example, the log data of the log record A 702 and the log data of the log record B 704 are different. For example, and as illustrated, the identifications 706a-b are different, the interaction types 708a-b are different, and the other information 710a-b are different.

Other log data of the log record A 702 may be similar or identical to other log data of the log record B 704. For example, in the illustrated example, the log record A 702 and the log record B 704 are not processed due to a timeout error or some other suitable error for not being processed. As illustrated, the log record A 702 includes the error type 714a that recites "log data not processed within designated time," and the log record B 704 includes the error type 714b that recites "server timeout error." While not exactly the same, the error types 714a-b are similar. Accordingly, the user interface 700 can include a comment box 716 or other suitable metadata that may highlight or otherwise provide guidance for a user or other suitable entity viewing the user interface 700. For example, the comment box 716 is illustrated as reciting "log records with a timeout error," but other suitable information can be displayed via the comment box 716 for informing the user of common or similar error types between the log record A 702, the log record B 704, and any other suitable log record.

The error types 714a-b may be adjusted or otherwise enriched. For example, the text of the error types 714a-b may be adjusted to highlight or otherwise draw attention to the error types 714a-b. As illustrated, the text of the error types 714a-b are bolded, italicized, and characterized by a font different than the font of the other portions of the log data. In other non-depicted examples, the text of the error types may be highlighted with a different color, the text of the error types 714a-b may be a different color, and the like to highlight the error types 714a-b. Additionally or alternatively, a source or reason for the error in the respective log record may be adjusted, highlighted, or otherwise enriched (in a same or other page of an interface). For example, in the illustrated example, each of the sources 712a-b includes a typographical error (where one source included an extra "i" and one source included an extra "w"), which may have caused the respective timeout errors. Accordingly, the text of the sources 712a-b is underlined to highlight or otherwise draw attention to the source of the error in the respective log record.

Figure 8:
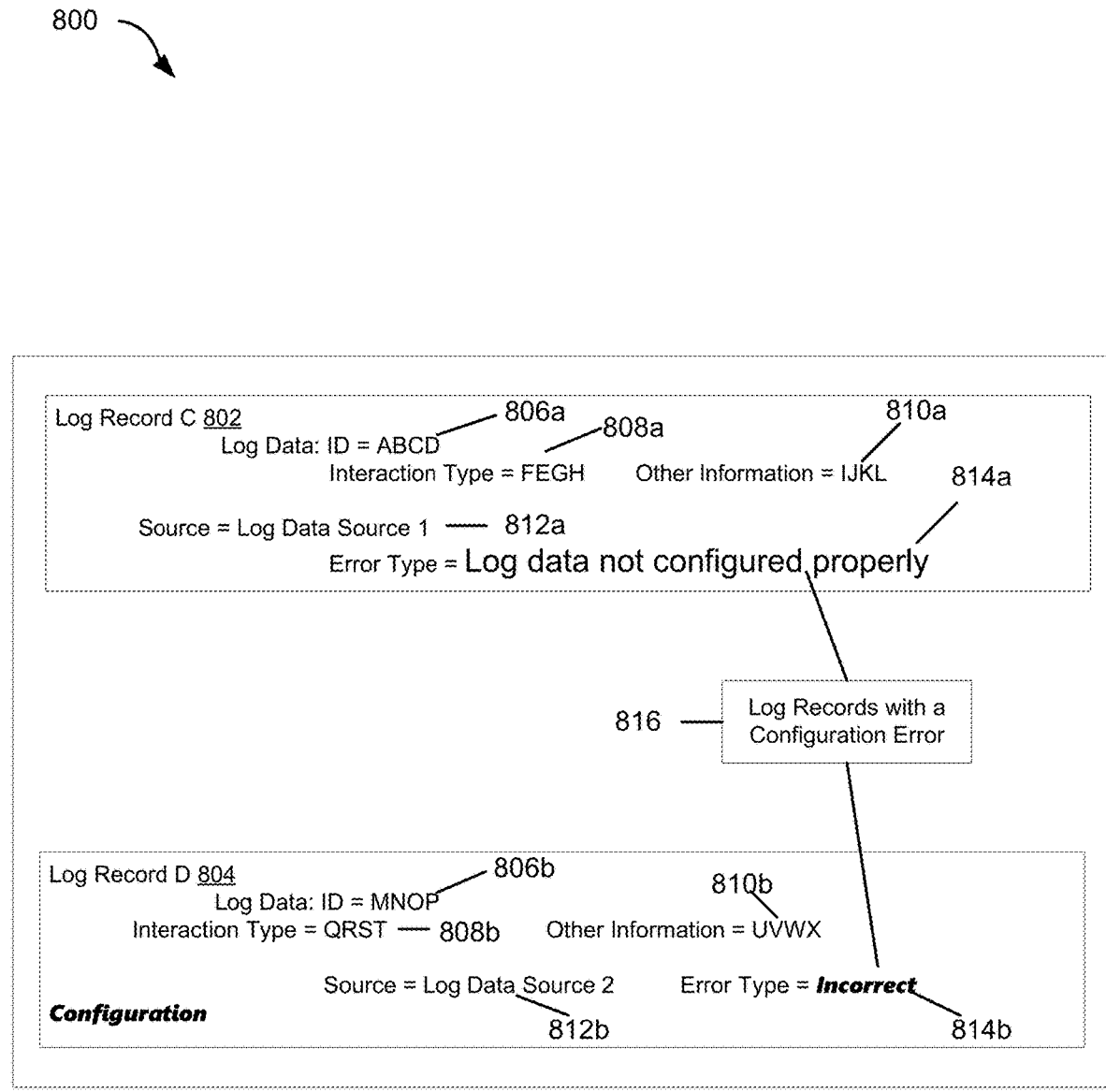
FIG. 8 is another example of a user interface for displaying different log records with a similar error highlighted in the respective log record according to an embodiment.

FIG. 8 is an example of a user interface 800 that displays different log records that were detected as including a similar error according to an embodiment. As illustrated, the user interface 800 includes log record C 802 and log record D 804. The log record C 802 and the log record D 804 each include respective log data. For example, the log data of the log record C 802 includes an identification 806a, an interaction type 808a, other information 810a, a source 812a, and an error type 814a. Additionally, the log data of the log record D 804 includes an identification 806b, an interaction type 808b, other information 810b, a source 812b, and an error type 814b. In some embodiments, the log data of the log record C 802 and the log data of the log record D 804 may be different. For example, and as illustrated, the identifications 806a-b are different, the interaction types 808a-b are different, and the other information 810a-b are different.

Other log data of the log record C 802 may be similar or identical to other log data of the log record D 804. For example, the log record C 802 and the log record D 804 are not processed due to a configuration error or some other suitable error for not being processed. As illustrated, the log record C 802 includes the error type 814a that recites "log data not configured properly," and the log record D 804 includes the error type 814*b* that recites "incorrect configuration." While not exactly the same, the error types 814*a-b* are similar. Accordingly, the user interface 800 includes a comment box 816 or other suitable metadata that may highlight or otherwise provide guidance for a user or other suitable entity viewing the user interface 800. For example, the comment box 816 is illustrated as reciting "log records with a configuration error," but other suitable information can be displayed via the comment box 816 for informing the user of common or similar error types between the log record C 802, the log record D 804, and any other suitable log record.

In some embodiments, the error types 814*a-b* may be adjusted or otherwise enriched. For example, the text of the error types 814*a-b* may be adjusted to highlight or otherwise draw attention to the error types 814*a-b*. As illustrated, the text of the error type 814*a* is enlarged and characterized by a font different than the font of the other portions of the log data, and the text of the error type 814*b* is bolded, italicized, and characterized by a font different than the font of the other portions of the log data. In other embodiments, the text of the error types 814*a-b* may be highlighted with a different color, the text of the error types 814*a-b* may be a different color, and the like to highlight the error types 814*a-b*. Additionally or alternatively, a source or reason for the error in the respective log record may be adjusted, highlighted, or otherwise enriched. For example, the log data included in the respective log records are scattered throughout the log record in an arrangement, which causes the respective configuration errors, that is recognized by an asynchronous processing system. Accordingly, the text of the log data that is arranged in a way that may not be recognized is bolded, italicized, highlighted a different color, or the like for highlighting or otherwise drawing attention to the source of the error in the respective log record.

Illustrative Systems

Figure 9:
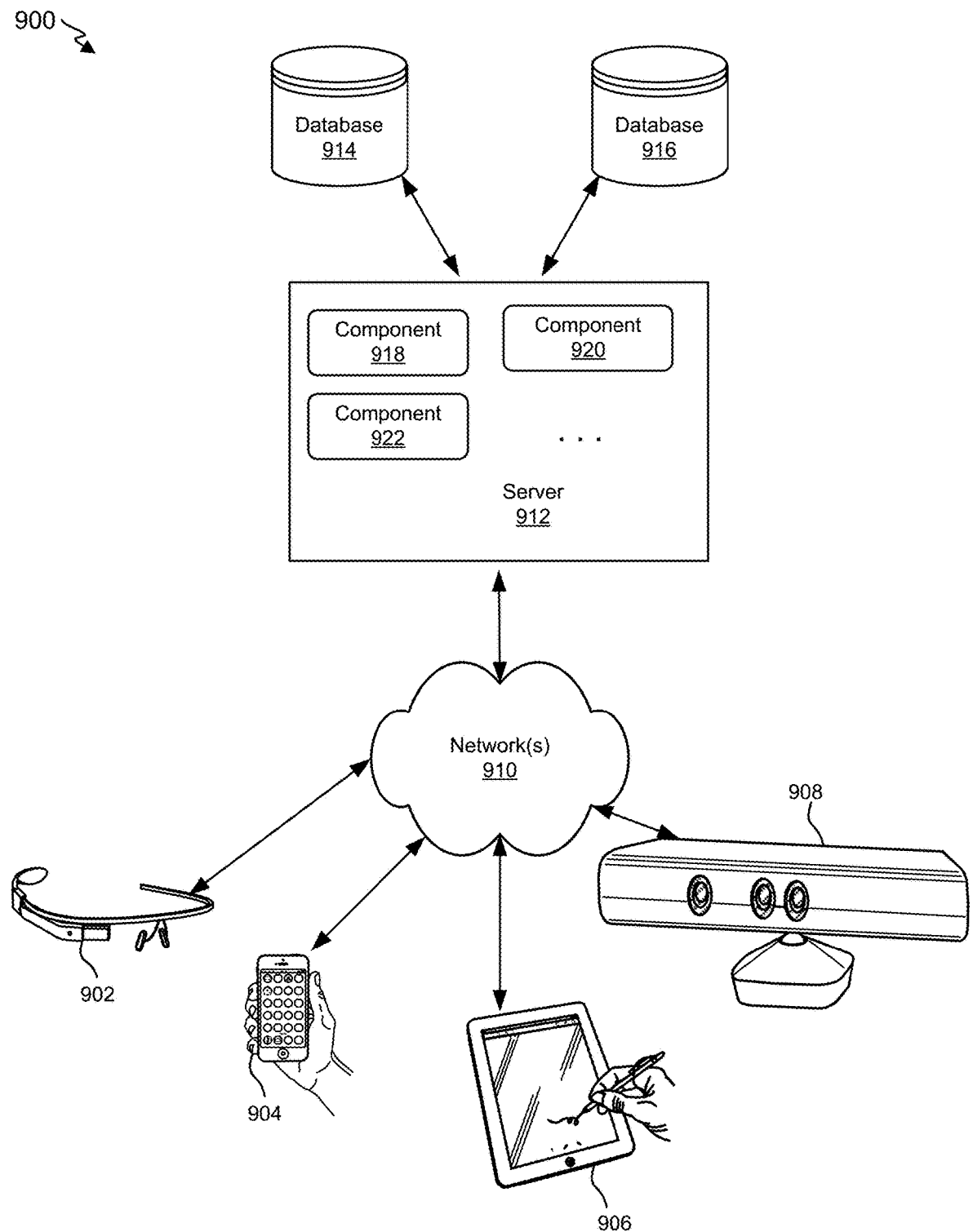
FIG. 9 is a simplified diagram illustrating a distributed system for implementing one of the embodiments.

FIG. 9 depicts a simplified diagram of a distributed system 900 for implementing one of the embodiments. In the illustrated embodiment, distributed system 900 includes one or more client computing devices 902, 904, 906, and 908, which are configured to execute and operate a client application such as a web browser, proprietary client (e.g., Oracle Forms), or the like over one or more network(s) 910. Server 912 may be communicatively coupled with remote client computing devices 902, 904, 906, and 908 via network(s) 910.

In various embodiments, server 912 may be adapted to run one or more services or software applications provided by one or more of the components of the system. In some embodiments, these services may be offered as web-based or cloud services or under a Software as a Service (SaaS) model to the users of client computing devices 902, 904, 906, and/or 908. Users operating client computing devices 902, 904, 906, and/or 908 may in turn utilize one or more client applications to interact with server 912 to utilize the services provided by these components.

In the configuration depicted in the figure, the software components 918, 920 and 922 of distributed system 900 are shown as being implemented on server 912. In other embodiments, one or more of the components of distributed system 900 and/or the services provided by these components may also be implemented by one or more of the client computing devices 902, 904, 906, and/or 908. Users operating the client computing devices may then utilize one or more client applications to use the services provided by these components. These components may be implemented in hardware, firmware, software, or combinations thereof. It should be appreciated that various different system configurations are possible, which may be different from distributed system 900. The embodiment shown in the figure is thus one example of a distributed system for implementing an embodiment system and is not intended to be limiting.

Client computing devices 902, 904, 906, and/or 908 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 902, 904, 906, and 908 may be any other electronic device, such as a thin-client computer, an Internet-enabled gaming system (e.g., a Microsoft Xbox gaming console with or without a Kinect® gesture input device), and/or a personal messaging device, capable of communicating over network(s) 910.

Although exemplary distributed system 900 is shown with four client computing devices, any number of client computing devices may be supported. Other devices, such as devices with sensors, etc., may interact with server 912.

Network(s) 910 in distributed system 900 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 910 can be a local area network (LAN), such as one based on Ethernet, Token-Ring and/or the like. Network(s) 910 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 912 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 912 may be adapted to run one or more services or software applications described in the foregoing disclosure. For example, server 912 may correspond to a server for performing processing described above according to an embodiment of the present disclosure.

Server 912 may run an operating system including any of those discussed above, as well as any commercially available server operating system. Server 912 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 912 may include one or more applications to analyze and consolidate data feeds and/or event updates received from users of client computing devices 902, 904, 906, and 908. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 912 may also include one or more applications to display the data feeds and/or real-time events via one or more display devices of client computing devices 902, 904, 906, and 908.

Distributed system 900 may also include one or more databases 914 and 916. Databases 914 and 916 may reside in a variety of locations. By way of example, one or more of databases 914 and 916 may reside on a non-transitory storage medium local to (and/or resident in) server 912. Alternatively, databases 914 and 916 may be remote from server 912 and in communication with server 912 via a network-based or dedicated connection. In one set of embodiments, databases 914 and 916 may reside in a storage-area network (SAN). Similarly, any necessary files for performing the functions attributed to server 912 may be stored locally on server 912 and/or remotely, as appropriate. In one set of embodiments, databases 914 and 916 may include relational databases, such as databases provided by Oracle, that are adapted to store, update, and retrieve data in response to SQL-formatted commands.

Figure 10:
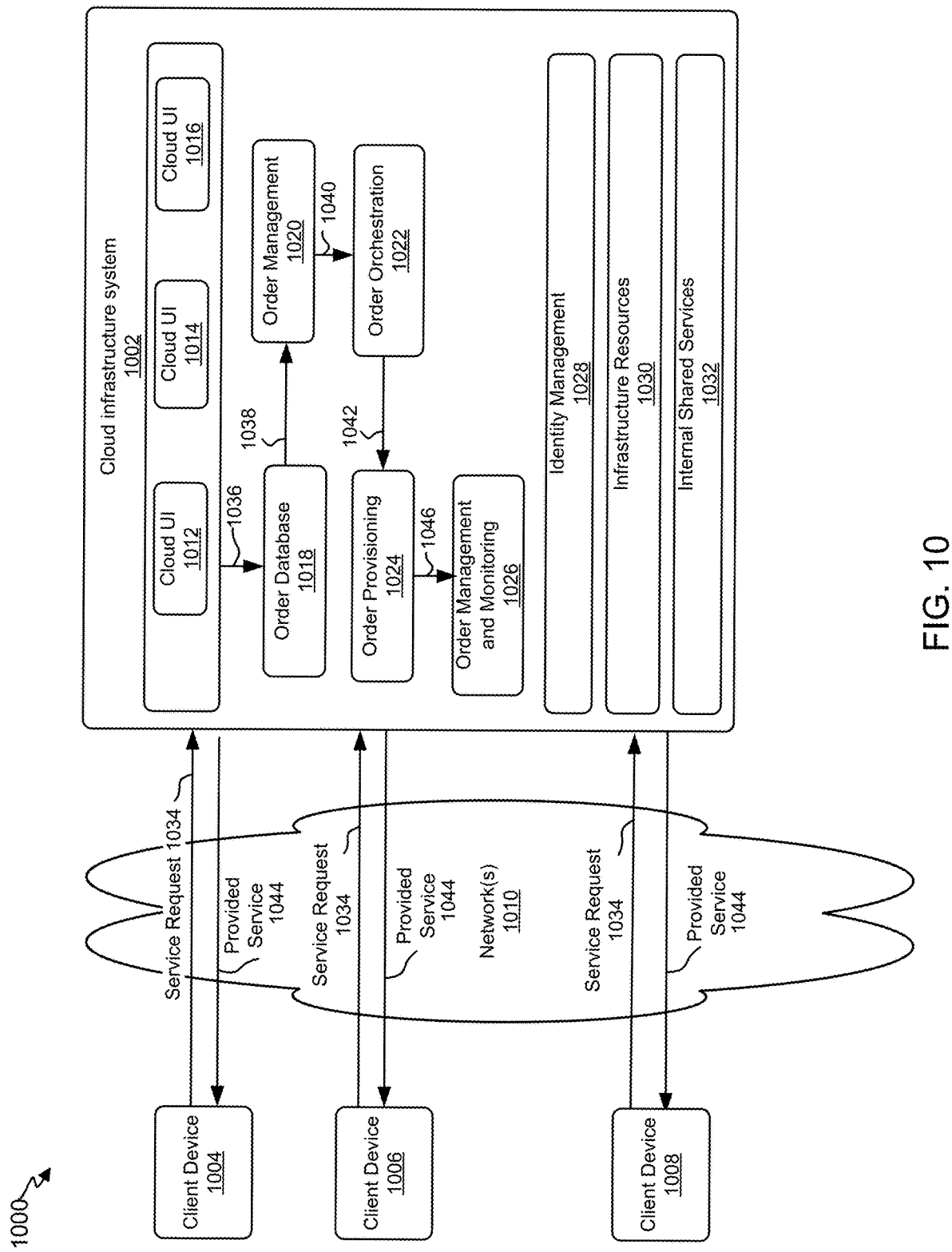
FIG. 10 is a simplified block diagram illustrating one or more components of a system environment according to an embodiment.

FIG. 10 is a simplified block diagram of one or more components of a system environment 1000 by which services provided by one or more components of an embodiment system may be offered as cloud services, in accordance with an embodiment of the present disclosure. In the illustrated embodiment, system environment 1000 includes one or more client computing devices 1004, 1006, and 1008 that may be used by users to interact with a cloud infrastructure system 1002 that provides cloud services. The client computing devices may be configured to operate a client application such as a web browser, a proprietary client application (e.g., Oracle Forms), or some other application, which may be used by a user of the client computing device to interact with cloud infrastructure system 1002 to use services provided by cloud infrastructure system 1002.

It should be appreciated that cloud infrastructure system 1002 depicted in the figure may have other components than those depicted. Further, the embodiment shown in the figure is only one example of a cloud infrastructure system that may incorporate an embodiment of the invention. In some other embodiments, cloud infrastructure system 1002 may have more or fewer components than shown in the figure, may combine two or more components, or may have a different configuration or arrangement of components.

Client computing devices 1004, 1006, and 1008 may be devices similar to those described above for 902, 904, 906, and 908.

Although exemplary system environment 1000 is shown with three client computing devices, any number of client computing devices may be supported. Other devices such as devices with sensors, etc. may interact with cloud infrastructure system 1002.

Network(s) 1010 may facilitate communications and exchange of data between clients 1004, 1006, and 1008 and cloud infrastructure system 1002. Each network may be any type of network familiar to those skilled in the art that can support data communications using any of a variety of commercially-available protocols, including those described above for network(s) 1010.

Cloud infrastructure system 1002 may comprise one or more computers and/or servers that may include those described above for server 912.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1002 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1002 may be adapted to automatically provision, manage and track a customer's subscription to services offered by cloud infrastructure system 1002. Cloud infrastructure system 1002 may provide the cloud services via different deployment models. For example, services may be provided under a public cloud model in which cloud infrastructure system 1002 is owned by an organization selling cloud services (e.g., owned by Oracle) and the services are made available to the general public or different industry enterprises. As another example, services may be provided under a private cloud model in which cloud infrastructure system 1002 is operated solely for a single organization and may provide services for one or more entities within the organization. The cloud services may also be provided under a community cloud model in which cloud infrastructure system 1002 and the services provided by cloud infrastructure system 1002 are shared by several organizations in a related community. The cloud services may also be provided under a hybrid cloud model, which is a combination of two or more different models.

In some embodiments, the services provided by cloud infrastructure system 1002 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1002. Cloud infrastructure system 1002 then performs processing to provide the services in the customer's subscription order.

In some embodiments, the services provided by cloud infrastructure system 1002 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various cloud applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1002 may also include infrastructure resources 1030 for providing the resources used to provide various services to customers of the cloud infrastructure system. In one embodiment, infrastructure resources 1030 may include pre-integrated and optimized combinations of hardware, such as servers, storage, and networking resources to execute the services provided by the PaaS platform and the SaaS platform.

In some embodiments, resources in cloud infrastructure system 1002 may be shared by multiple users and dynamically re-allocated per demand. Additionally, resources may be allocated to users in different time zones. For example, cloud infrastructure system 1030 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1032 may be provided that are shared by different components or modules of cloud infrastructure system 1002 and by the services provided by cloud infrastructure system 1002. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1002 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1002, and the like.

In one embodiment, as depicted in the figure, cloud management functionality may be provided by one or more modules, such as an order management module 1020, an order orchestration module 1022, an order provisioning module 1024, an order management and monitoring module 1026, and an identity management module 1028. These modules may include or be provided using one or more computers and/or servers, which may be general purpose computers, specialized server computers, server farms, server clusters, or any other appropriate arrangement and/or combination.

In exemplary operation 1034, a customer using a client device, such as client device 1004, 1006 or 1008, may interact with cloud infrastructure system 1002 by requesting one or more services provided by cloud infrastructure system 1002 and placing an order for a subscription for one or more services offered by cloud infrastructure system 1002. In certain embodiments, the customer may access a cloud User Interface (UI), cloud UI 1012, cloud UI 1014 and/or cloud UI 1016 and place a subscription order via these UIs. The order information received by cloud infrastructure system 1002 in response to the customer placing an order may include information identifying the customer and one or more services offered by the cloud infrastructure system 1002 that the customer intends to subscribe to.

After an order has been placed by the customer, the order information is received via the cloud UIs, 1012, 1014 and/or 1016.

At operation 1036, the order is stored in order database 1018. Order database 1018 can be one of several databases operated by cloud infrastructure system 1018 and operated in conjunction with other system elements.

At operation 1038, the order information is forwarded to an order management module 1020. In some instances, order management module 1020 may be configured to perform billing and accounting functions related to the order, such as verifying the order, and upon verification, booking the order.

At operation 1040, information regarding the order is communicated to an order orchestration module 1022. Order orchestration module 1022 may utilize the order information to orchestrate the provisioning of services and resources for the order placed by the customer. In some instances, order orchestration module 1022 may orchestrate the provisioning of resources to support the subscribed services using the services of order provisioning module 1024.

In certain embodiments, order orchestration module 1022 enables the management of processes associated with each order and applies logic to determine whether an order should proceed to provisioning. At operation 1042, upon receiving an order for a new subscription, order orchestration module 1022 sends a request to order provisioning module 1024 to allocate resources and configure those resources needed to fulfill the subscription order. Order provisioning module 1024 enables the allocation of resources for the services ordered by the customer. Order provisioning module 1024 provides a level of abstraction between the cloud services provided by cloud infrastructure system 1000 and the physical implementation layer that is used to provision the resources for providing the requested services. Order orchestration module 1022 may thus be isolated from implementation details, such as whether or not services and resources are actually provisioned on the fly or pre-provisioned and only allocated/assigned upon request.

At operation 1044, once the services and resources are provisioned, a notification of the provided service may be sent to customers on client devices 1004, 1006 and/or 1008 by order provisioning module 1024 of cloud infrastructure system 1002.

At operation 1046, the customer's subscription order may be managed and tracked by an order management and monitoring module 1026. In some instances, order management and monitoring module 1026 may be configured to collect usage statistics for the services in the subscription order, such as the amount of storage used, the amount data transferred, the number of users, and the amount of system up time and system down time.

In certain embodiments, cloud infrastructure system 1000 may include an identity management module 1028. Identity management module 1028 may be configured to provide identity services, such as access management and authorization services in cloud infrastructure system 1000. In some embodiments, identity management module 1028 may control information about customers who wish to utilize the services provided by cloud infrastructure system 1002. Such information can include information that authenticates the identities of such customers and information that describes which actions those customers are authorized to perform relative to various system resources (e.g., files, directories, applications, communication ports, memory segments, etc.) Identity management module 1028 may also include the management of descriptive information about each customer and about how and by whom that descriptive information can be accessed and modified.

Figure 11:
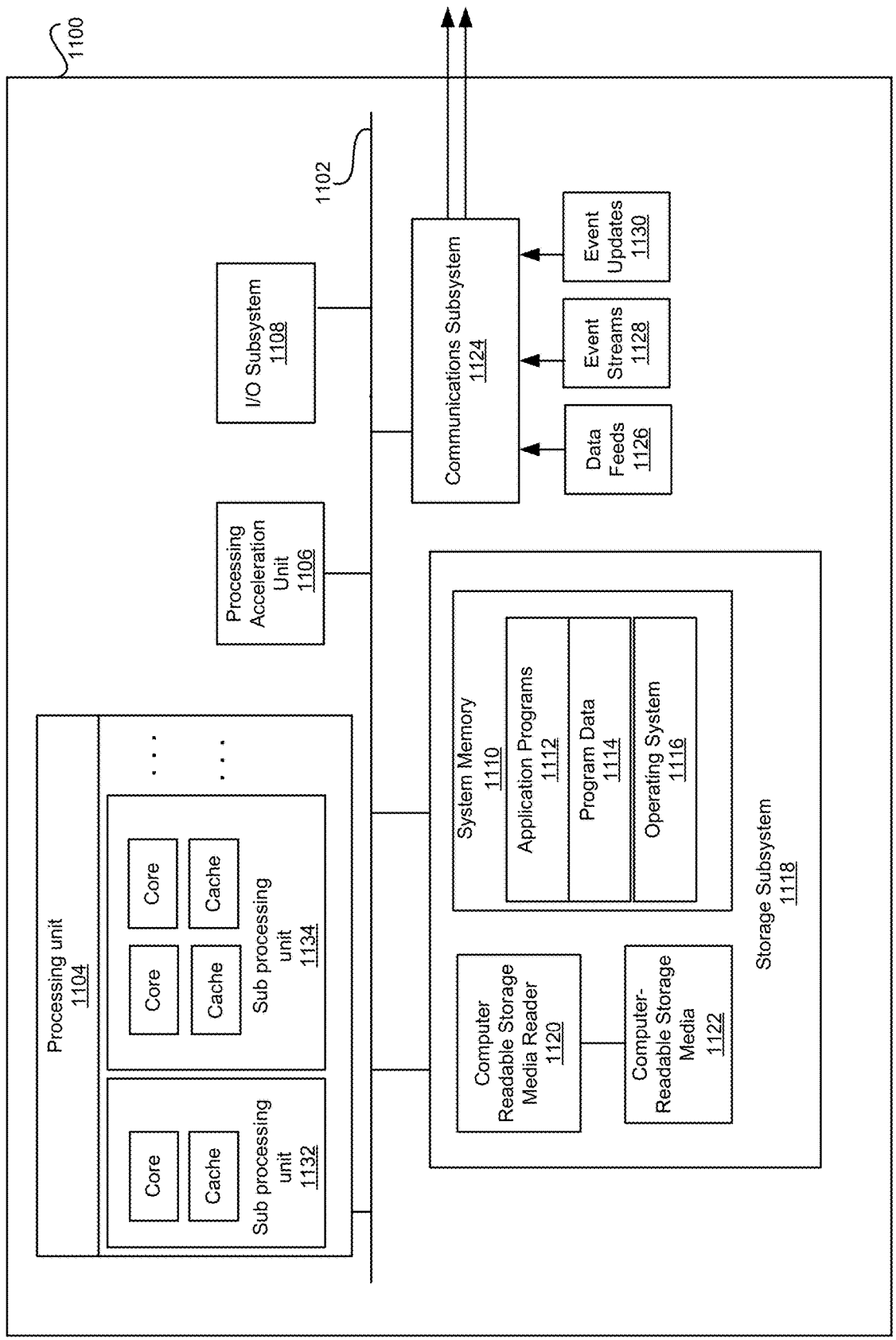
FIG. 11 illustrates an exemplary computer system, in which various embodiments of the present invention may be implemented.

FIG. 11 illustrates an exemplary computer system 1100, in which various embodiments of the present invention may be implemented. The system 1100 may be used to implement any of the computer systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that comprises software elements, shown as being currently located within a system memory 1110. System memory 1110 may store program instructions that are loadable and executable on processing unit 1104, as well as data generated during the execution of these programs.

Depending on the configuration and type of computer system 1100, system memory 1110 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1104. In some implementations, system memory 1110 may include multiple different types of memory, such as static random access memory (SRAM) or dynamic random access memory (DRAM). In some implementations, a basic input/output system (BIOS), containing the basic routines that help to transfer information between elements within computer system 1100, such as during start-up, may typically be stored in the ROM. By way of example, and not limitation, system memory 1110 also illustrates application programs 1112, which may include client applications, Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1118 may also provide a tangible computer-readable storage medium for storing the basic programming and data constructs that provide the functionality of some embodiments. Software (programs, code modules, instructions) that when executed by a processor provide the functionality described above may be stored in storage subsystem 1118. These software modules or instructions may be executed by processing unit 1104. Storage subsystem 1118 may also provide a repository for storing data used in accordance with the present invention.

Storage subsystem 1100 may also include a computer-readable storage media reader 1120 that can further be connected to computer-readable storage media 1122. Together and, optionally, in combination with system memory 1110, computer-readable storage media 1122 may comprehensively represent remote, local, fixed, and/or removable storage devices plus storage media for temporarily and/or more permanently containing, storing, transmitting, and retrieving computer-readable information.

Computer-readable storage media 1122 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1100.

By way of example, computer-readable storage media 1122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some embodiments communications subsystem 1124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 1202.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method comprising:
   receiving, by a computing system, log data that includes a plurality of log records;
   asynchronously processing, by the computing system, the log data to validate a configuration of each log record of the plurality of log records and data included in each log record of the plurality of log records;
   determining, by the computing system and during the asynchronous processing, that one or more attributes of a particular subset of log records of the plurality of log records corresponds to one or more errors;
   generating, by the computing system and using the particular subset of log records, one or more enriched log records by augmenting each log record of the particular subset of log records with error information that indicates one or more categories corresponding to the one or more errors; and
   generating, by the computing system, a user interface to facilitate correction of the one or more errors, the user interface comprising a plurality of interactive elements corresponding to a plurality of error metrics of different categories of errors, wherein the one or more categories of the one or more errors are included in the different categories of errors.

2. The computer-implemented method of claim 1, further comprising:
   identifying input received via the user interface, the input indicating selection of a particular interactive element of the plurality of interactive elements corresponding to a particular error metric of the plurality of error metrics; and
   generating a second user interface comprising a second plurality of interactive elements representing a subset of the one or more enriched log records, wherein the subset of the one or more enriched log records includes the one or more enriched log records that include the one or more errors corresponding to the particular error metric.

3. The computer-implemented method of claim 2, further comprising:
   identifying second input received via the second interface, the second input indicating selection of a different particular interactive element of the second plurality of interactive elements corresponding to a particular enriched log record of the subset of the one or more enriched log records; and
   generating a third user interface comprising the particular enriched log record, wherein the particular enriched log record comprises at least one annotation identifying an error of the one or more errors that corresponds to the particular error metric.

4. The computer-implemented method of claim 3, further comprising:
   generating, for display on the third user interface, one or more suggestions for correcting the error;
   identifying third input received via the third interface, the third input indicating that the error of the particular enriched log record is corrected; and causing a log record of the plurality of log records corresponding to the particular enriched log record to be reprocessed.

5. The computer-implemented method of claim 3, wherein the error is a configuration error that prevents the particular enriched log record from being processed, and wherein the at least one annotation comprises a selectable element that links the third user interface to a log data repository that includes a backed-up version of a log record of the plurality of log records corresponding to the particular enriched log record.

6. The computer-implemented method of claim 5, further comprising:
identifying third input received via the third interface, the third input indicating a selection of the selectable element; and
providing access to the backed-up version of the log record corresponding to the particular enriched log record to facilitate correction of the log record corresponding to the particular enriched log record.

7. The computer-implemented method of claim 1, wherein the different categories of errors comprise at least one of an invalid configuration, an invalid payload, a structure mismatch, not authorized, not found, or a failure-to-parse.

8. A non-transitory machine-readable storage medium comprising a computer-program product that includes instructions configured to cause a data processing apparatus to perform operations comprising:
receiving log data that includes a plurality of log records;
asynchronously processing the log data to validate a configuration of each log record of the plurality of log records and data included in each log record of the plurality of log records;
determining, during the asynchronous processing, that one or more attributes of a particular subset of log records of the plurality of log records corresponds to one or more errors;
generating, using the particular subset of log records, one or more enriched log records by augmenting each log record of the particular subset of log records with error information that indicates one or more categories corresponding to the one or more errors; and
generating a user interface to facilitate correction of the one or more errors, the user interface comprising a plurality of interactive elements corresponding to a plurality of error metrics of different categories of errors, wherein the one or more categories of the one or more errors are included in the different categories of errors.

9. The non-transitory machine-readable storage medium of claim 8 wherein the operations further comprise:
identifying input received via the user interface, the input indicating selection of a particular interactive element of the plurality of interactive elements corresponding to a particular error metric of the plurality of error metrics; and
generating a second user interface comprising a second plurality of interactive elements representing a subset of the one or more enriched log records, wherein the subset of the one or more enriched log records includes the one or more enriched log records that include the one or more errors corresponding to the particular error metric.

10. The non-transitory machine-readable storage medium of claim 9, wherein the operations further comprise:
identifying second input received via the second interface, the second input indicating selection of a different particular interactive element of the second plurality of interactive elements corresponding to a particular enriched log record of the subset of the one or more enriched log records; and
generating a third user interface comprising the particular enriched log record, wherein the particular enriched log record comprises at least one annotation identifying an error of the one or more errors that corresponds to the particular error metric.

11. The non-transitory machine-readable storage medium of claim 10, wherein the operations further comprise:
generating, for display on the third user interface, one or more suggestions for correcting the error;
identifying third input received via the third interface, the third input indicating that the error of the particular enriched log record is corrected; and
causing a log record of the plurality of log records corresponding to the particular enriched log record to be reprocessed.

12. The non-transitory machine-readable storage medium of claim 10, wherein the error is a configuration error that prevents the particular enriched log record from being processed, and wherein the at least one annotation comprises a selectable element that links the third user interface to a log data repository that includes a backed-up version of a log record of the plurality of log records corresponding to the particular enriched log record.

13. The non-transitory machine-readable storage medium of claim 12, wherein the operations further comprise:
identifying third input received via the third interface, the third input indicating a selection of the selectable element; and
providing access to the backed-up version of the log record corresponding to the particular enriched log record to facilitate correction of the log record corresponding to the particular enriched log record.

14. The non-transitory machine-readable storage medium of claim 8, wherein the different categories of errors comprise at least one of an invalid configuration, an invalid payload, a structure mismatch, not authorized, not found, or a failure-to-parse.

15. A system, comprising:
one or more data processors; and
a non-transitory computer-readable storage medium containing instructions which, when executed on the one or more data processors, cause the one or more data processors to perform operations comprising:
receiving log data that includes a plurality of log records;
asynchronously processing the log data to validate a configuration of each log record of the plurality of log records and data included in each log record of the plurality of log records;
determining, during the asynchronous processing, that one or more attributes of a particular subset of log records of the plurality of log records corresponds to one or more errors;
generating, using the particular subset of log records, one or more enriched log records by augmenting each log record of the particular subset of log records with error information that indicates one or more categories corresponding to the one or more errors; and
generating a user interface to facilitate correction of the one or more errors, the user interface comprising a plurality of interactive elements corresponding to a plurality of error metrics of different categories of errors, wherein the one or more categories of the one or more errors are included in the different categories of errors.

16. The system of claim 15, wherein the operations further comprise:
   identifying input received via the user interface, the input indicating selection of a particular interactive element of the plurality of interactive elements corresponding to a particular error metric of the plurality of error metrics;
   generating a second user interface comprising a second plurality of interactive elements representing a subset of the one or more enriched log records, wherein the subset of the one or more enriched log records includes the one or more enriched log records that include the one or more errors corresponding to the particular error metric;
   identifying second input received via the second interface, the second input indicating selection of a different particular interactive element of the second plurality of interactive elements corresponding to a particular enriched log record of the subset of the one or more enriched log records; and
   generating a third user interface comprising the particular enriched log record, wherein the particular enriched log record comprises at least one annotation identifying an error of the one or more errors that corresponds to the particular error metric.

17. The system of claim 16, wherein the operations further comprise:
   generating, for display on the third user interface, one or more suggestions for correcting the error;
   identifying third input received via the third interface, the third input indicating that the error of the particular enriched log record is corrected; and
   causing a log record of the plurality of log records corresponding to the particular enriched log record to be reprocessed.

18. The system of claim 16, wherein the error is a configuration error that prevents the particular enriched log record from being processed, and wherein the at least one annotation comprises a selectable element that links the third user interface to a log data repository that includes a backed-up version of a log record of the plurality of log records corresponding to the particular enriched log record.

19. The system of claim 18, wherein the operations further comprise:
   identifying third input received via the third interface, the third input indicating a selection of the selectable element; and
   providing access to the backed-up version of the log record corresponding to the particular enriched log record to facilitate correction of the log record corresponding to the particular enriched log record.

20. The system of claim 15, wherein the different categories of errors comprise at least one of an invalid configuration, an invalid payload, a structure mismatch, not authorized, not found, or a failure-to-parse.

* * * * *